US012710646B2

(12) United States Patent
Smeeton et al.

(10) Patent No.: US 12,710,646 B2
(45) Date of Patent: Aug. 18, 2026

(54) USER POSITIONING WITHIN AN EYE-BOX OF A HEAD-UP DISPLAY

(71) Applicant: Dualitas Ltd, Milton Keynes (GB)

(72) Inventors: Timothy Smeeton, Milton Keynes (GB); Hugo Malin-Clegg, Milton Keynes (GB)

(73) Assignee: Dualitas Ltd, Milton Keynes (GB)

( * ) Notice: Subject to any disclaimer, the term of this patent is extended or adjusted under 35 U.S.C. 154(b) by 0 days.

(21) Appl. No.: 19/252,400

(22) Filed: Jun. 27, 2025

(65) Prior Publication Data

US 2026/0003183 A1 Jan. 1, 2026

(30) Foreign Application Priority Data

Jun. 28, 2024 (GB) ..................................... 2409360

(51) Int. Cl.
*G02B 27/01* (2006.01)
*G02B 27/00* (2006.01)

(52) U.S. Cl.
CPC ..... *G02B 27/0093* (2013.01); *G02B 27/0081* (2013.01); *G02B 27/0103* (2013.01);
(Continued)

(58) Field of Classification Search
CPC .............. G02B 27/144; G02B 27/0172; G02B 27/0149; G02B 27/0101; G02B 27/145;
(Continued)

(56) References Cited

U.S. PATENT DOCUMENTS 10,732,709 B1 8/2020 Chao
10,977,815 B1 4/2021 Chao
(Continued)

FOREIGN PATENT DOCUMENTS

EP 3722863 A1 10/2020
GB 2636220 A1 6/2025
(Continued)

OTHER PUBLICATIONS

Combined Search and Examination Report, United Kingdom Patent Application No. GP2409360.1, dated Dec. 19, 2024.
(Continued)

*Primary Examiner* — Dawayne Pinkney
(74) *Attorney, Agent, or Firm* — McDonnell Boehnen Hulbert & Berghoff LLP

(57) ABSTRACT

A head-up display method includes determining a first intensity for a first target image based on a distance between a first viewing position and a reference viewing position; and illuminating a first hologram corresponding to the first target image to holographically reconstruct the first target image at the first intensity; then, determining a second intensity for a second target image based on a distance between a second viewing position different to the first viewing position and the reference viewing position; and illuminating a second hologram corresponding to the second target image to reconstruct the second target image at the second intensity; wherein the second intensity is different to the first intensity, and a difference between the first intensity and the second intensity indicates whether the second viewing position is closer to or further from the predetermined reference viewing position compared to the first viewing position.

20 Claims, 11 Drawing Sheets

(52) U.S. Cl.
CPC ................ *G02B 2027/0105* (2013.01); *G02B 2027/0118* (2013.01)

(58) Field of Classification Search
CPC .......... A01B 9/001; B60R 1/00; G09G 3/003; A61B 3/113; A61B 3/1225; A61B 3/103; H04N 7/18; G01S 11/12; G01S 1/02; G06T 19/00; G06T 19/006
USPC ............ 359/629–636, 13–14, 566, 569, 618; 345/7–9, 632–633, 207; 349/11
See application file for complete search history.

(56) References Cited

U.S. PATENT DOCUMENTS

| | | | | |
|---|---|---|---|---|
| 11,592,664 | B2 | 2/2023 | Christmas | |
| 11,846,775 | B2 | 12/2023 | Christmas | |
| 11,874,460 | B2 | 1/2024 | Christmas | |
| 11,938,816 | B2 | 3/2024 | Christmas | |
| 12,181,668 | B2 | 12/2024 | Christmas | |
| 2013/0176533 | A1 | 7/2013 | Raffle | |
| 2015/0138248 | A1 | 5/2015 | Schrader | |
| 2016/0187851 | A1 | 6/2016 | Park | |
| 2019/0196402 | A1 | 6/2019 | Leister | |
| 2019/0302583 | A1 | 10/2019 | Taniguchi | |
| 2021/0165212 | A1* | 6/2021 | Christmas | G03H 1/2249 |
| 2021/0252978 | A1 | 8/2021 | Christmas | |
| 2022/0236571 | A1 | 7/2022 | Popovich | |
| 2022/0252890 | A1 | 8/2022 | Danziger | |
| 2022/0283433 | A1 | 9/2022 | Christmas | |
| 2022/0413302 | A1 | 12/2022 | Meitav | |
| 2023/0064690 | A1 | 3/2023 | Smeeton | |
| 2023/0314802 | A1 | 10/2023 | Smeeton | |
| 2023/0359027 | A1 | 11/2023 | Smeeton | |
| 2024/0094676 | A1 | 3/2024 | Lin | |
| 2024/0151969 | A1 | 5/2024 | Spurr | |

FOREIGN PATENT DOCUMENTS

| | | | | |
|---|---|---|---|---|
| JP | 2021056357 A | | 4/2021 | |
| KR | 20180072354 A | * | 6/2018 | H04N 13/305 |
| WO | 2022115476 A1 | | 6/2022 | |
| WO | 2025120069 A1 | | 6/2025 | |

OTHER PUBLICATIONS

International Search Report and Written Opinion for International Application No. PCT/EP2025/068263 mailed on Sep. 19, 2025, 15 pages.

* cited by examiner

USER POSITIONING WITHIN AN EYE-BOX OF A HEAD-UP DISPLAY

CROSS-REFERENCE TO RELATED APPLICATIONS

This application claims the benefit of priority of United Kingdom Patent Application no. 2409360.1, filed Jun. 28, 2024, which is hereby incorporated herein by reference in its entirety.

FIELD

The present disclosure relates to a method of providing feedback on the position of a user within (or relative to) an eye-box (or viewing window) of a head-up display. More broadly, the present disclosure relates to a method for head-up display. Some embodiments relate to a head-up display having a controller suitable for performing a method of providing feedback on the position of a user within (or relative to) an eye-box (or viewing window) of a head-up display. Some embodiments relate to a head-up display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD".

SUMMARY

Aspects of the present disclosure are defined in the appended independent claims.

Head-up displays have a volume of space in which the user (or viewer) is able to position their head and see the full field of view (FOV) of the display, with the user/viewer observing the image being displayed at sufficiently high quality to meet the design specifications. In automotive applications, this invisible region is called the eye-box of the system. More broadly, this region may be referred to as the viewing window or region. In this disclosure, the viewing window (the eye-box) may be a 2D shape such as a quadrilateral (e.g. it may be rectangular) or a 3D shape such as cube or cuboid. For an optimal viewing experience, the user's head should remain within the eye-box at all times they wish to view the content. Due to the invisible nature of the eye-box, it is not always easy for the user to know their position within the eye-box (i.e. their position relative to the boundary or edge of the eye-box) and if they are at an optimum viewing position. For example, in the context of using the head-up display in a vehicle, a user could have their seat arranged and positioned such that, for a normal sitting position, their head is always towards the edge of the eye-box. This will mean that the user may only be able to move their head a small distance in a number of directions before they are no longer within the eye-box and unable to see the image being displayed. Given the invisible nature of the boundaries of the eye-box, and the inability of the user to easily appreciate the position of said boundaries in 3D space, this can create frustration in the user as they may have difficulty knowing if they are at a good or even optimal position within the eye-box to view the displayed image, or they may have difficulty staying in the eye-box.

One method of mitigating this issue is to increase the size of the eye-box to be a sufficient size that positioning is never an issue. This would, however, significantly increase the volume and cost of the head-up display. Increasing the volume of the system would cause it to take up more space within the dashboard of a vehicle, in which space is already at a premium due to number of components that need to be present therein and the low profile of dashboards desired by automotive manufacturers. Alternatively, a physical representation of the eye-box boundaries could be incorporated into the user's space (such as a sheet of material with a region cut out representing the eye-box). This would allow the user to able to position themselves such that they are always in a good viewing position. However, whilst this approach may be suitable for demonstrating a head-up display in a laboratory, it is visually unattractive and is not acceptable in final products, such as within vehicles.

Other methods of notifying the user that they have reached (or are approaching) the edge of the eye-box include using sound effects or visual cues in the imagery of the head-up display (e.g. arrows to guide the user away from the edge of the eye-box). However, such methods can be distracting for the user. Furthermore, they may require additional components and/or remove luminance bandwidth from the content being displayed. That is, displaying visual cues in HUD imagery may take light away from the total amount generated by the system, meaning there will be less light available for displaying the originally intended content. This is particularly true in a holographic system, where the hologram distributes the received light such that the amount of image content affects brightness—unless countermeasures are used.

In a first aspect, there is provided a method of head-up display (a method of providing feedback on the position or location of a user/viewer within or relative to an eye-box or viewing window for a head-up display, or in other words a method of providing feedback to a user or viewer during head-up display). The method comprises receiving a signal indicating that a viewing position (of a user or viewer) within a viewing window (eye-box) has changed. This signal may be received from an eye tracking or driver monitoring system, as will be further described below. The viewing position is the position from which the user or viewer perceives the displayed image. If the user/viewer is an artificial system, then the viewing position will be the position of the camera lens/detector (or other such optical equipment). If the user/viewer is a human, then the viewing position will be the position of at least one of their eyes, as will be described in greater detail below. The viewing position having changed refers to the viewing position at successive (but not necessarily consecutive) time increments being at a different location on a plane of the viewing window (eye-box)—e.g. relative to the centre of the viewing window. Further/elaborated possible definitions of the viewing position having changed are provided below. The method further comprises changing an intensity of a displayed image (or, at least a portion thereof) in response to the signal. By intensity, it is meant a characteristic of the displayed image (such as the perceived brightness) such that changing it makes said image fade or intensify from the perspective of the user/viewer. That is, the overall or total intensity of the light forming at least part of the displayed image is adjusted, rather than one or more wavelengths of the light (e.g. changing the intensity of one colour of light forming the displayed image), which is a matter of colour balance. In other words, unlike previous systems which modify (or adjust) the intensities of individual wavelengths of the light forming the displayed image in comparison to one another for the purposes of colour balancing, the present invention instead relates to a method in which the intensities of all the wavelengths of the light forming the displayed image are adjusted at the same rate (i.e. throughout the method the relative intensities of the various wavelengths remain constant).

This allows the user to naturally know when they are reaching the edge of the viewing window (eye-box). As the user/viewer moves towards or away from the edge of the viewing window (eye-box), the intensity of the displayed image will be changed to naturally show that. This method of notifying the user when they are reaching the edge of the viewing window (eye-box) does not have any distracting noises or images and neither does it remove luminance bandwidth from the content being displayed. This method has been found to help users of head-up displays to instinctively identify/locate and keep away from the edges of the viewing window (eye-box), ensuring that they can see the displayed HUD image at a sufficiently high quality at all times during use.

In other words, this approach feels natural and unconsciously guides the user towards the centre of the eye-box and towards the best viewing position. As will be described further below, this method can be easily adapted to provide more or less aggressive fadeout profiles. Furthermore, no additional components are required to allow the method to work (to support the functionality)—that is, the functionality can be provided in software e.g. as a part of the hologram determination (for example during the calculation process). That is, the method can be achieved with the hardware components that would already be present in a known head-up display.

The method can also be used for image optimisation or debugging purposes in order to concentrate efforts of the centre (or optimal or "average" position) of the eye-box. The edges of the eye-box are sometimes most likely to exhibit image artefacts or distortions such as display colour shifts/imbalances and other unexpected behaviours (as compared to the intended image to be displayed), due to imperfections in components of the system. As such, it may be beneficial to concentrate optimisation or the debugging process on the central region of the eye-box by using the above-described method to focus on regions of where these issues are less present to assess image quality (i.e. by reducing the intensity of the displayed image around the edge of the eye-box to make the eye-box appear smaller to the user). This means such assessments do not become biased by the edge case performance issues, which are different because of the limitations of physical optics. This benefit also applies in normal use, as the user will be guided to the centre of the eye-box where said artefacts or distortions are least likely to occur.

This approach can also be used to provide a fade-in behaviour when the user enters the eye-box for the first time or a new user sits down to view the content. This provides useful functionality for display or start-up purposes.

Finally, if more artefacts become visible to the user (or any artefacts present become more visible) further away from the centre of the eye-box (or, conversely, closer towards the edge of the eye-box), then the method helps prevent the user from perceiving these artefacts by naturally guiding them towards the centre of the eye-box.

The intensity of the displayed image may be changed at the viewing window. The step of changing the intensity of the displayed image may comprise changing the intensity of each of a plurality of wavelengths of light forming the displayed image at the same rate. That is, as described above, a characteristic of the displayed image (such as the perceived brightness) is changed such that said image fades or intensifies from the perspective of the user/viewer. In other words, previous systems often, for example, modify relative intensities of colour components of their holograms, or change the intensity of the light emitted from the display device, to ensure the displayed image is as consistent as possible at the viewing window (i.e., from the perspective of the user/viewer). This may be to mitigate issues in the colour balance or intensity levels produced whilst replicating the light forming the displayed image across the viewing window. However, the present method goes against this preconception of wanting the displayed image to be as constant as possible by having the appearance of the displayed image change across the viewing window (eye-box) to provide the functions described above.

The signal may indicate that a distance on a plane of the viewing window (eye-box) from the viewing position to a primary viewing position (e.g. a preferred position or "average" position) of the viewing window has changed. The distance may be described as being in the plane of the viewing window/eye-box, or as being perpendicular to the propagation direction of the light forming the displayed image. By "primary viewing position" it may be meant the optimal point in the viewing window/eye-box for the user to view the displayed image. This optimal point may, for example, be the centre of the viewing window/eye-box. The centre of the viewing window/eye-box may be optimal as it allows the greatest range of motion of the user before reaching the edge.

The signal may indicate that the distance between the viewing position (i.e. the viewer or user themselves) and the primary viewing position of the viewing window (eye-box) has increased and the change of intensity may be a decrease in intensity. Alternatively, the signal may indicate that the distance between the viewing position (i.e. the viewer or user themselves) and the primary viewing position of the viewing window (eye-box) has decreased and the change of intensity may be an increase in intensity. In other words, the change in intensity may occur if the signal indicates that viewer or viewing position (or, the user or eye-box) has moved further away from, or moved closer towards, the primary viewing position. The decrease or increase in intensity can also be described as the displayed image appearing more or less faded to the user (or that the displayed image is faded in or faded out).

The step of changing the intensity of the displayed image may be performed if the signal indicates that the viewing position has moved within a threshold distance of an edge of the viewing window (eye-box). This step may be performed only if such a criterion is met. Alternatively, the step of changing the intensity of the displayed image may be performed if the signal indicates that the viewing position has moved out of a threshold distance of an edge of the viewing window (eye-box). This step may be performed only if such a criterion is met. That is, rather than basing the change in intensity on a change in distance from the primary viewing position, the method may instead base the change in intensity on the proximity of the viewing position to a threshold distance of (or from) an edge of the viewing window (eye-box). The threshold distance may be a distance chosen to border the edge of the viewing window/eye-box in order to provide sufficient warning to the user that, as they move, they are approaching said edge.

The step of changing the intensity of the displayed image may comprise changing a scaling factor of an algorithm arranged to calculate a hologram of the image. The image may then be displayed to the user as a hologram or transformed (e.g. by Fourier transform or another propagation-based transform) back into the image domain before being displayed to the user. In other words, a scaling factor is applied in the hologram algorithm such that less or more light is used to create the FOV or HUD image for that eye position, resulting in a gradual dimming or brightening (fading in and out) of the image content. The step of changing the intensity of the displayed image may comprise changing an intensity of a light source used to form the image. The step of changing the intensity of the displayed image may comprise changing a polarisation angle of a light source used to form the image. This varies the amount of light that is transmitted to the user. These methods of changing the intensity of the display image can all be used to fade in or out the image as required as described herein. As described above, the present method can be easily adapted to provide more or less aggressive fadeout profiles as would be understood by the skilled person depending on the system design parameters.

The method may comprise gradually changing the intensity of the displayed image as the viewing position changes. That is, as the distance to or from the viewing position to the primary viewing window and/or threshold distance (as described above) changes, as does the intensity of the displayed image.

The intensity of the displayed image may be changed with respect to the change in the viewing position in a linear relationship. The intensity of the displayed image may be changed with respect to the change in the viewing position in an exponential tangent relationship. The intensity of the displayed image may be changed with respect to the change in the viewing position in a natural logarithmic relationship. These relationships allow different patterns of fade-in and fade-out of the displayed image to be viewable to the user upon nearing the edge of the viewing window/eye-box.

In other words, as the user (and by extension their viewing position) moves towards the edge of the eye-box (whether that be tracked/signified via distance from a primary viewing position or a threshold distance around said edge), the image content is gradually dimmed. Conversely, as the user moves back into the eye-box/viewing window, the dimming factor is reduced and the intensity of the image increases.

The signal may indicate that the position of an eye of a viewer (a user) has changed. That is, as described above, the position of the viewer (or user) having changed by be identified by the movement of at least one of their eyes. The intensity of the image may be changed for the eye of the viewer for which the signal has indicated a change of position. The intensity of the image displayed to the other eye of the viewer may remain constant. In other words, if one eye of the user reaches the edge of the viewing window/eye-box before their other eye, then the fade-in or fade-out of the displayed image may only be applied to the eye in proximity to said edge. This provides a subtle fading effect to the displayed image that can indicate to the user that they are approaching the edge of the viewing window/eye-box. In other words, the method of the present disclosure means that the intensity change of the displayed image can be calculated on a per-eye basis, so that the fade out or fade in is perceived differently by each eye.

In a second aspect, there is provided a head-up display comprising a controller arranged to perform the above-described method. The signal may be received from a Driver Monitoring System of a vehicle housing the head-up display. The Driver Monitoring System (DMS) may comprise an eye tracking system as described below, the eye tracking system capable of emitting the signal that the viewing position has changed (as described above). In other words, a DMS is used to track the user's head (or, more specifically, their eye or eyes) to determine their location relative to the eye-box.

In a third aspect, there is provided a method of head-up display. The method comprises receiving a signal indicating that a viewing position within a viewing window is beyond a threshold distance of a primary viewing position of the viewing window. The method further comprises changing an intensity of a displayed image at the viewing position in response to the signal.

In this way, there is also provided a method by which the head-up display can have a privacy filter. That is, if the viewing window/eye-box is big enough to allow the potential for two or more users/viewers to view the displayed image at the same time, the method allows for the identification of users beyond a "primary" user (that is, in the example of a head-up display in a vehicle, the driver of said vehicle). The primary viewing position in this aspect refers to the viewing position of the "primary" user. The threshold distance is therefore a distance beyond which it is deemed that a viewing position cannot belong to the "primary" user (i.e. a viewing position that the "primary" user could not feasibly/comfortably reach). Thus, any viewing position identified outside of this threshold must belong to a user beyond the "primary" user. By changing the intensity of the displayed image to these viewing positions, the displayed image can be "hidden" from the non-"primary" user(s), thus acting as a privacy filter.

The intensity of the displayed image at the viewing position may be changed to zero. That is, the displayed image can be hidden from the user(s)/viewer(s) beyond the "primary" user/viewer by ensuring that none of the light forming the displayed image reaches said non-"primary" user(s). The intensity of parts of the displayed image may be changed, rather than the whole of the displayed image. This allows parts of the displayed image to be kept private from other users whilst allowing other parts to be kept "public".

The signal may indicate that an eye of a viewer (or user) is beyond a threshold distance of a primary viewing position of the viewing window. As discussed in relation to the first aspect, the viewing position(s) may be tracked by monitoring the position(s) of the eye(s) of the user(s).

Embodiments of the disclosure are identified in the following items:

Item 1. A method comprising:
- receiving a first signal indicating a first viewing position of a user within a viewing space of a head-up display;
- determining a first intensity for a first target image based on a distance between the first viewing position and a predetermined reference viewing position within the viewing space; and
- illuminating a first hologram corresponding to the first target image to holographically reconstruct the first target image at the first intensity;
- then,
- receiving a second signal indicating a second viewing position of the user within the viewing space, wherein the second viewing position is different to the first viewing position; and
- determining a second intensity for a second target image based on a distance between the second viewing position and the predetermined reference viewing position within the viewing space;
- illuminating a second hologram corresponding to the second target image to reconstruct the second target image at the second intensity;
- wherein
  - the second intensity is different to the first intensity, and
  - a difference between the first intensity and the second intensity indicates whether the second viewing position is closer to the predetermined reference viewing position or further from the predetermined reference viewing position compared to the first viewing position.

Item 2. The method of Item 1, wherein the first target image is reconstructed within the viewing space by an eye of the user and the second target image is reconstructed within the viewing space by an eye of the user.

Item 3. The method of Item 1, wherein the first target image is reconstructed at a diffuser of the head-up display to form a first reconstructed image, and the first reconstructed image is propagated to an eye of the user, and wherein the second target image is reconstructed at the diffuser of the head-up display to form a second reconstructed image, and the second reconstructed image is propagated to the eye of the user.

Item 4. The method of any preceding Item, wherein the distance between the first viewing position and the predetermined reference viewing position within the viewing space is greater than the distance between the second viewing position and the predetermined reference viewing position within the viewing space, and wherein the second intensity is greater than the first intensity.

Item 5. The method of any of Items 1-3, wherein the distance between the first viewing position and the predetermined reference viewing position within the viewing space is less than the distance between the second viewing position and the predetermined reference viewing position within the viewing space, and wherein the second intensity is less than the first intensity.

Item 6. The method of any preceding Item, wherein the predetermined reference viewing position is in the center of the viewing space.

Item 7. The method of any preceding Item, wherein the first target image comprises first image content and the second target image comprises second image content, and wherein the first image content is the same as the second image content or the first image content is different to the second image content.

Item 8. The method of any preceding Item, wherein the viewing space is a three-dimensional space.

Item 9. The method of any preceding Item, wherein the predetermined reference viewing position is a three-dimensional space or a 2-dimensional plane.

Item 10. The method of any preceding Item, wherein the viewing space comprises a boundary, and wherein the second intensity communicates to the user whether the second viewing position is within a threshold distance of the boundary.

Item 11. The method of any preceding Item, wherein reconstructing the first target image at the first intensity comprises at least one selected from the group comprising: changing a scaling factor of an algorithm arranged to calculate the first hologram of the first target image; changing a light source intensity of a light source used to illuminate the first hologram; and changing a polarisation angle of a light source used to illuminate the first hologram.

Item 12. The method of any preceding Item, wherein reconstructing the second target image at the second intensity comprises at least one selected from the group comprising: changing a scaling factor of an algorithm arranged to calculate the second hologram of the second target image; changing a light source intensity of a light source used to illuminate the second hologram; and changing a polarisation angle of a light source used to illuminate the second hologram.

Item 13. The method of any preceding Item, wherein the second intensity is determined such that the difference between the first intensity and the second intensity is based on a relationship between the difference between the first viewing position and the second viewing position, the relationship being selected from the group comprising: a linear relationship, an exponential tangent relationship, a natural logarithmic relationship, and a step function relationship.

Item 14. The method of any preceding Item, wherein the first signal indicates that a first eye of the user is at the first viewing position, and wherein the second signal indicates that the first eye of the user is at the second viewing position.

Item 15. The method of any preceding Item, wherein the first signal and the second signal are received from a driver monitoring system of a vehicle housing the head-up display.

Item 16. A head-up display comprising:
- a controller arranged to receive
  - a first target image,
  - a second target image,
  - a first signal indicating a first viewing position of a user within a viewing space of the head-up display, and a second signal indicating a second viewing position of the user within the viewing space of the head-up display;

a holographic projector connected to the controller, wherein the holographic projector comprises a spatial light modulator and at least one light source; and wherein the controller is configured to:

calculate a distance between the first viewing position and a predetermined reference viewing position;

determine a first intensity for the first target image based on the calculated distance between the first viewing position and the predetermined reference viewing position;

determine a first hologram corresponding to the first target image;

send the first hologram to the holographic projector;

calculate a distance between the second viewing position and the predetermined reference viewing position;

determine a second intensity for the second target image based on the calculated distance between the second viewing position and the predetermined reference viewing position;

determine a second hologram corresponding to the second target image; and send the second hologram to the holographic projector;

wherein the holographic projector is configured to:

display the first hologram on the spatial light modulator;

illuminate, with the at least one light source, the first hologram to holographically reconstruct the first target image at the first intensity;

display the second hologram on the spatial light modulator; and illuminate, with the at least one light source, the second hologram to holographically reconstruct the second target image the second intensity, wherein the second intensity is different to the first intensity, and a difference between the first intensity and the second intensity indicates whether the second viewing position is closer to the predetermined reference viewing position or further from the predetermined reference viewing position compared to the first viewing position.

Item 17. The head-up display of item 16, further comprising a driver monitoring system arranged to:

determine the first viewing position of the user;

send the first signal indicating the first viewing position to the controller;

determine the second viewing position of the user; and send the second signal indicating the second viewing position to the controller.

Item 18. A (transitory or non-transitory) computer-readable medium comprising instructions that, when executed by one or more processors, cause the one or more processors to:

receive a first signal indicating a first viewing position of a user within a viewing space of a head-up display;

determine a first intensity for a first target image based on a distance between the first viewing position and a predetermined reference viewing position within the viewing space;

illuminate a first hologram corresponding to the first target image to holographically reconstruct the first target image at the first intensity; then, receive a second signal indicating a second viewing position of the user within the viewing space, wherein the second viewing position is different to the first viewing position;

determine a second intensity for a second target image based on a distance between the second viewing position and the predetermined reference viewing position within the viewing space; and illuminate a second hologram corresponding to the second target image to reconstruct the second target image at the second intensity;

wherein the second intensity is different to the first intensity, and a difference between the first intensity and the second intensity indicates whether the second viewing position is closer to the predetermined reference viewing position or further from the predetermined reference viewing position compared to the first viewing position.

Features and advantages described in relation to one aspect may be applicable to other aspects.

In the present disclosure, the term "replica" is merely used to reflect that spatially modulated light is divided such that a complex light field is directed along a plurality of different optical paths. The word "replica" is used to refer to each occurrence or instance of the complex light field after a replication event—such as a partial reflection-transmission by a pupil expander. Each replica travels along a different optical path. Some embodiments of the present disclosure relate to propagation of light that is encoded with a hologram, not an image—i.e., light that is spatially modulated with a hologram of an image, not the image itself. It may therefore be said that a plurality of replicas of the hologram are formed. The person skilled in the art of holography will appreciate that the complex light field associated with propagation of light encoded with a hologram will change with propagation distance. Use herein of the term "replica" is independent of propagation distance and so the two branches or paths of light associated with a replication event are still referred to as "replicas" of each other even if the branches are a different length, such that the complex light field has evolved differently along each path. That is, two complex light fields are still considered "replicas" in accordance with this disclosure even if they are associated with different propagation distances—providing they have arisen from the same replication event or series of replication events.

A "diffracted light field" or "diffractive light field" in accordance with this disclosure is a light field formed by diffraction. A diffracted light field may be formed by illuminating a corresponding diffractive pattern. In accordance with this disclosure, an example of a diffractive pattern is a hologram and an example of a diffracted light field is a holographic light field or a light field forming a holographic reconstruction of an image. The holographic light field forms a (holographic) reconstruction of an image on a replay plane. The holographic light field that propagates from the hologram to the replay plane may be said to comprise light encoded with the hologram or light in the hologram domain. A diffracted light field is characterized by a diffraction angle determined by the smallest feature size of the diffractive structure and the wavelength of the light (of the diffracted light field). In accordance with this disclosure, it may also be said that a "diffracted light field" is a light field that forms a reconstruction on a plane spatially separated from the corresponding diffractive structure. An optical system is disclosed herein for propagating a diffracted light field from a diffractive structure to a viewer. The diffracted light field may form an image.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to 2 $\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as “after”, “subsequent”, “next”, “before” or suchlike—the present disclosure should be taken to include continuous and non-continuous events unless otherwise specified. For example, the description should be taken to include a case which is not continuous unless wording such as “just”, “immediate” or “direct” is used.

Although the terms “first”, “second”, etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

In the present disclosure, the term “substantially” when applied to a structural units of an apparatus may be interpreted as the technical feature of the structural units being produced within the technical tolerance of the method used to manufacture it.

Conventional Optical Configuration for Holographic Projection

Figure 1:
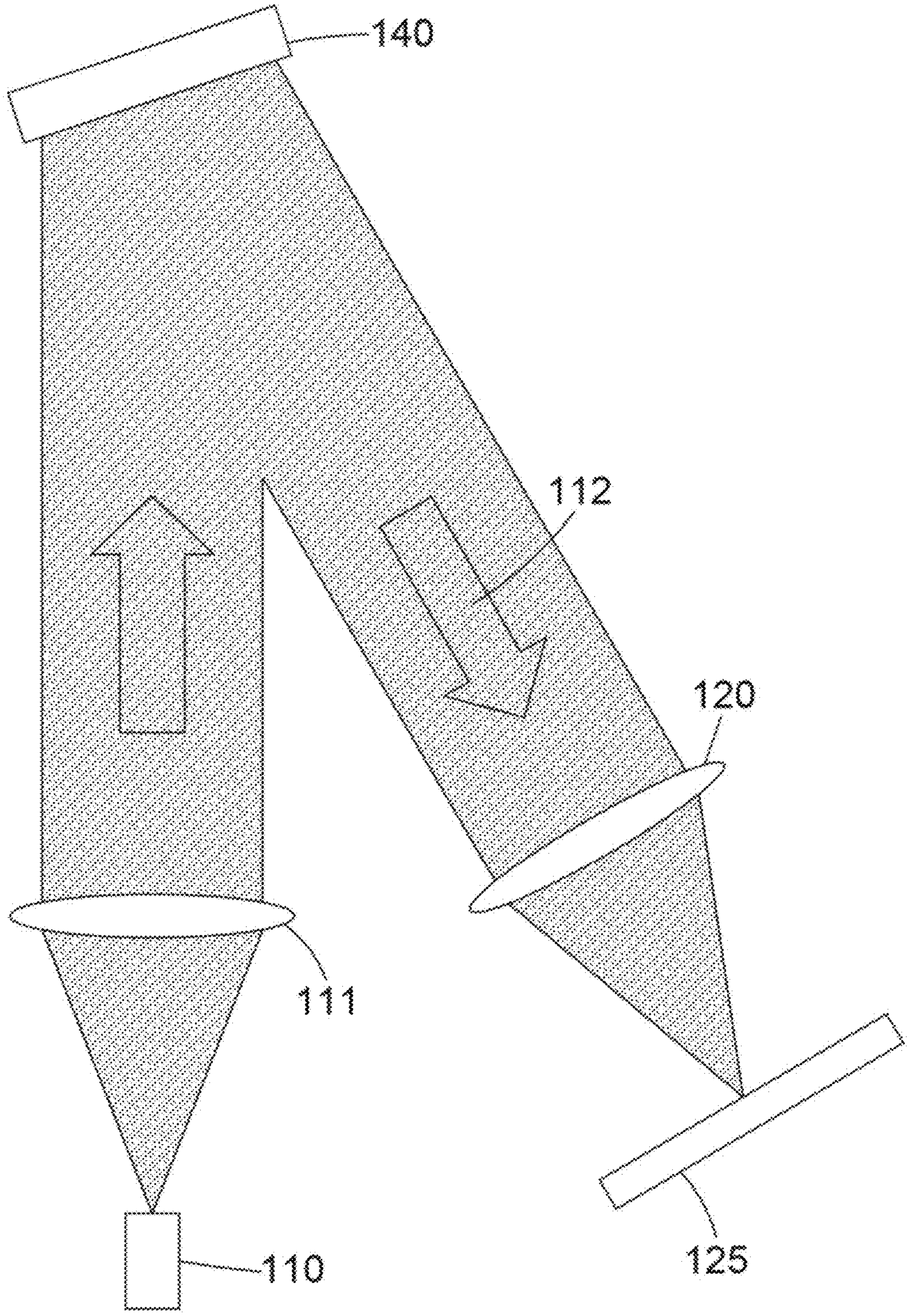
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, “LCOS”, device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform In some embodiments of the present disclosure, the lens of the viewer’s eye performs the hologram to image transformation.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms. Embodiments relate to Fourier holography and Gerchberg-Saxton type algorithms by way of example only. The present disclosure is equally applicable to Fresnel holography and Fresnel holograms which may be calculated by a similar method. In some embodiments, the hologram is a phase or phase-only hologram. However, the present disclosure is also applicable to holograms calculated by other techniques such as those based on point cloud methods.

In some embodiments, the hologram engine is arranged to exclude from the hologram calculation the contribution of light blocked by a limiting aperture of the display system. British patent application 2101666.2, filed 5 Feb. 2021 and incorporated herein by reference, discloses a first hologram calculation method in which eye-tracking and ray tracing are used to identify a sub-area of the display device for calculation of a point cloud hologram which eliminates ghost images. The sub-area of the display device corresponds with the aperture, of the present disclosure, and is used exclude light paths from the hologram calculation. British patent application 2112213.0, filed 26 Aug. 2021 and incorporated herein by reference, discloses a second method based on a modified Gerchberg-Saxton type algorithm which includes steps of light field cropping in accordance with pupils of the optical system during hologram calculation. The cropping of the light field corresponds with the determination of a limiting aperture of the present disclosure. British patent application 2118911.3, filed 23 Dec. 2021 and also incorporated herein by reference, discloses a third method of calculating a hologram which includes a step of determining a region of a so-called extended modulator formed by a hologram replicator. The region of the extended modulator is also an aperture in accordance with this disclosure.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Large Field of View and Eye-Box Using Small Display Device

Broadly, the present disclosure relates to image projection. It relates to a method of image projection and an image projector which comprises a display device. The present disclosure also relates to a projection system comprising the image projector and a viewing system, in which the image projector projects or relays light from the display device to the viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. In other examples, the image is a real image formed by holographic reconstruction and the image is projected or relayed to the viewing plane. In these other examples, spatially modulated light of an intermediate holographic reconstruction formed either in free space or on a screen or other light receiving surface between the display device and the viewer, is propagated to the viewer. In both cases, an image is formed by illuminating a diffractive pattern (e.g., hologram or kinoform) displayed on the display device.

The display device comprises pixels. The pixels of the display may display a diffractive pattern or structure that diffracts light. The diffracted light may form an image at a plane spatially separated from the display device. In accordance with well-understood optics, the magnitude of the maximum diffraction angle is determined by the size of the pixels and other factors such as the wavelength of the light.

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In some embodiments, the (light of a) hologram itself is propagated to the eyes. For example, spatially modulated light of the hologram (that has not yet been fully transformed to a holographic reconstruction, i.e. image)—that may be informally said to be "encoded" with/by the hologram—is propagated directly to the viewer's eyes. A real or virtual image may be perceived by the viewer. In these embodiments, there is no intermediate holographic reconstruction/image formed between the display device and the viewer. It is sometimes said that, in these embodiments, the lens of the eye performs a hologram-to-image conversion or transform. The projection system, or light engine, may be configured so that the viewer effectively looks directly at the display device.

Reference is made herein to a "light field" which is a "complex light field". The term "light field" merely indicates a pattern of light having a finite size in at least two orthogonal spatial directions, e.g. x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field.

In accordance with the principles of well-understood optics, the range of angles of light propagating from a display device that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-box.)

In some embodiments, the image perceived by a viewer is a virtual image that appears upstream of the display device—that is, the viewer perceives the image as being further away from them than the display device. Conceptually, it may therefore be considered that the viewer is looking at a virtual image through an 'display device-sized window', which may be very small, for example 1 cm in diameter, at a relatively large distance, e.g., 1 metre. And the user will be viewing the display device-sized window via the pupil(s) of their eye(s), which can also be very small. Accordingly, the field of view becomes small and the specific angular range that can be seen depends heavily on the eye position, at any given time.

A pupil expander addresses the problem of how to increase the range of angles of light rays that are propagated from the display device that can successfully propagate through an eye's pupil to form an image. The display device is generally (in relative terms) small and the projection distance is (in relative terms) large. In some embodiments, the projection distance is at least one—such as, at least two—orders of magnitude greater than the diameter, or width, of the entrance pupil and/or aperture of the display device (i.e., size of the array of pixels).

Use of a pupil expander increases the viewing area (i.e., user's eye-box) laterally, thus enabling some movement of the eye/s to occur, whilst still enabling the user to see the image. As the skilled person will appreciate, in an imaging system, the viewing area (user's eye box) is the area in which a viewer's eyes can perceive the image. The present disclosure encompasses non-infinite virtual image distances—that is, near-field virtual images.

Conventionally, a two-dimensional pupil expander comprises one or more one-dimensional optical waveguides each formed using a pair of opposing reflective surfaces, in which the output light from a surface forms a viewing window or eye-box. Light received from the display device (e.g., spatially modulated light from a LCOS) is replicated by the or each waveguide so as to increase the field of view (or viewing area) in at least one dimension. In particular, the waveguide enlarges the viewing window due to the generation of extra rays or "replicas" by division of amplitude of the incident wavefront.

The display device may have an active or display area having a first dimension that may be less than 10 cm such as less than 5 cm or less than 2 cm. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

In some embodiments—described only by way of example of a diffracted or holographic light field in accordance with this disclosure—a hologram is configured to route light into a plurality of channels, each channel corresponding to a different part (i.e. sub-area) of an image. The channels formed by the diffractive structure are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram may also be a point cloud hologram. The hologram is described herein as routing light into a plurality of hologram channels to reflect that the image that can be reconstructed from the hologram has a finite size and can be arbitrarily divided into a plurality of image sub-areas, wherein each hologram channel would correspond to each image sub-area. Importantly, the hologram of this example is characterised by how it distributes the image content when illuminated. Specifically and uniquely, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be divided into a plurality of hologram channels, wherein each hologram channel is defined by a range of light ray angles (in two-dimensions). It will be understood from the foregoing that any hologram channel (i.e. sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels.

Nevertheless, the hologram may still be identified. For example, if only a continuous part or sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e. is substantially the same as) the shape of the entrance pupil although the size may be different—at least, at the correct plane for which the hologram was calculated. Each light/hologram channel propagates from the hologram at a different angle or range of angles. Whilst these are example ways of characterising or identifying this type of hologram, other ways may be used. In summary, the hologram disclosed herein is characterised and identifiable by how the image content is distributed within light encoded by the hologram. Again, for the avoidance of any doubt, reference herein to a hologram configured to direct light or angularly-divide an image into a plurality of hologram channels is made by way of example only and the present disclosure is equally applicable to pupil expansion of any type of holographic light field or even any type of diffractive or diffracted light field.

The system can be provided in a compact and streamlined physical form. This enables the system to be suitable for a broad range of real-world applications, including those for which space is limited and real-estate value is high. For example, it may be implemented in a head-up display (HUD) such as a vehicle or automotive HUD.

In accordance with the present disclosure, pupil expansion is provided for diffracted or diffractive light, which may comprise diverging ray bundles. The diffracted light field may be defined by a "light cone". Thus, the size of the diffracted light field (as defined on a two-dimensional plane) increases with propagation distance from the corresponding diffractive structure (i.e. display device). It can be said that the pupil expander/s replicate the hologram or form at least one replica of the hologram, to convey that the light delivered to the viewer is spatially modulated in accordance with a hologram.

In some embodiments, two one-dimensional waveguide pupil expanders are provided, each one-dimensional waveguide pupil expander being arranged to effectively increase the size of the exit pupil of the system by forming a plurality of replicas or copies of the exit pupil (or light of the exit pupil) of the spatial light modulator. The exit pupil may be understood to be the physical area from which light is output by the system. It may also be said that each waveguide pupil expander is arranged to expand the size of the exit pupil of the system. It may also be said that each waveguide pupil expander is arranged to expand/increase the size of the eye box within which a viewer's eye can be located, in order to see/receive light that is output by the system.

Light Channelling

The hologram formed in accordance with some embodiments, angularly-divides the image content to provide a plurality of hologram channels which may have a cross-sectional shape defined by an aperture of the optical system. The hologram is calculated to provide this channelling of the diffracted light field. In some embodiments, this is achieved during hologram calculation by considering an aperture (virtual or real) of the optical system, as described above.

Figure 2:
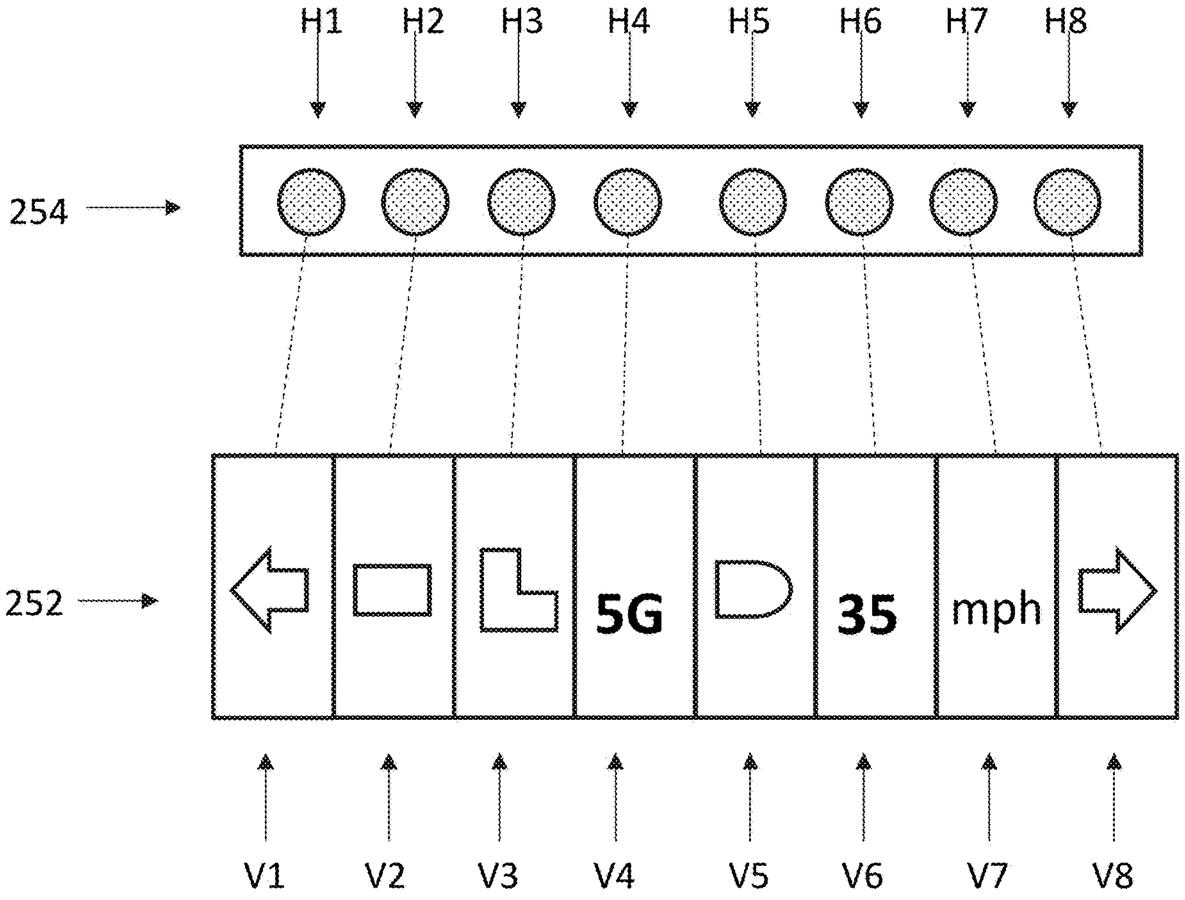
FIG. 2 shows an image for projection comprising eight image areas/components, V1 to V8, and cross-sections of the corresponding hologram channels, H1-H8.
Figure 3:
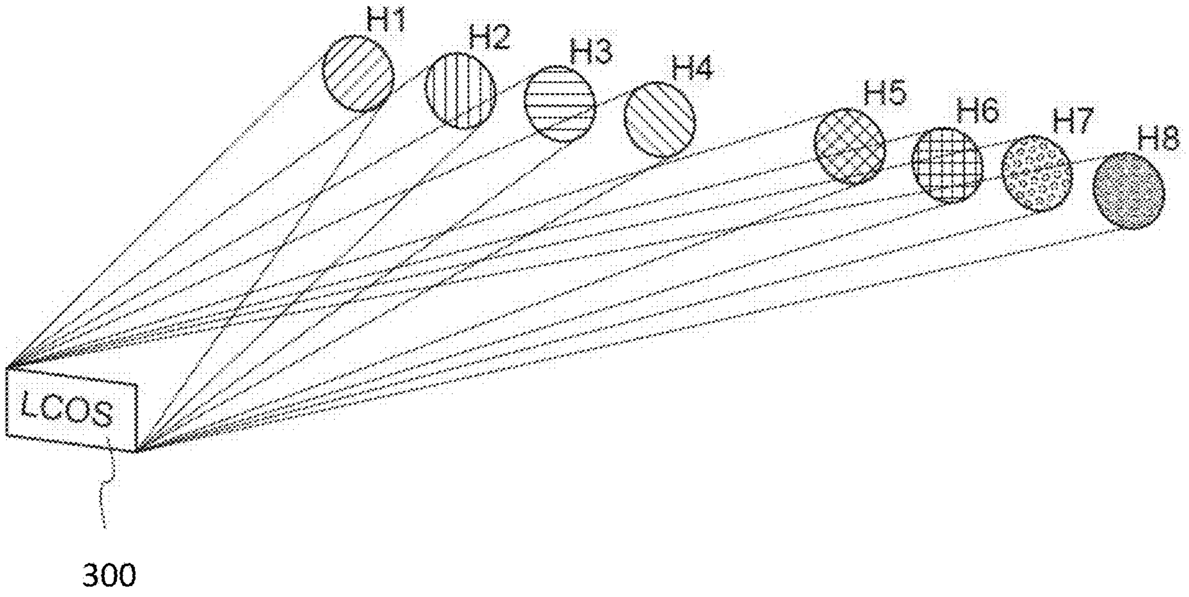
FIG. 3 shows a hologram displayed on an LCOS that directs light into a plurality of discrete areas.

FIGS. 2 and 3 show an example of this type of hologram that may be used in conjunction with a pupil expander as disclosed herein. However, this example should not be regarded as limiting with respect to the present disclosure.

FIG. 2 shows an image 252 for projection comprising eight image areas/components, V1 to V8. FIG. 2 shows eight image components by way of example only and the image 252 may be divided into any number of components. FIG. 2 also shows an encoded light pattern 254 (i.e., hologram) that can reconstruct the image 252—e.g., when transformed by the lens of a suitable viewing system. The encoded light pattern 254 comprises first to eighth sub-holograms or components, H1 to H8, corresponding to the first to eighth image components/areas, V1 to V8. FIG. 2 further shows how a hologram may decompose the image content by angle. The hologram may therefore be characterised by the channelling of light that it performs. This is illustrated in FIG. 3. Specifically, the hologram in this example directs light into a plurality of discrete areas. The discrete areas are discs in the example shown but other shapes are envisaged. The size and shape of the optimum disc may, after propagation through the waveguide, be related to the size and shape of an aperture of the optical system such as the entrance pupil of the viewing system.

Figure 4:
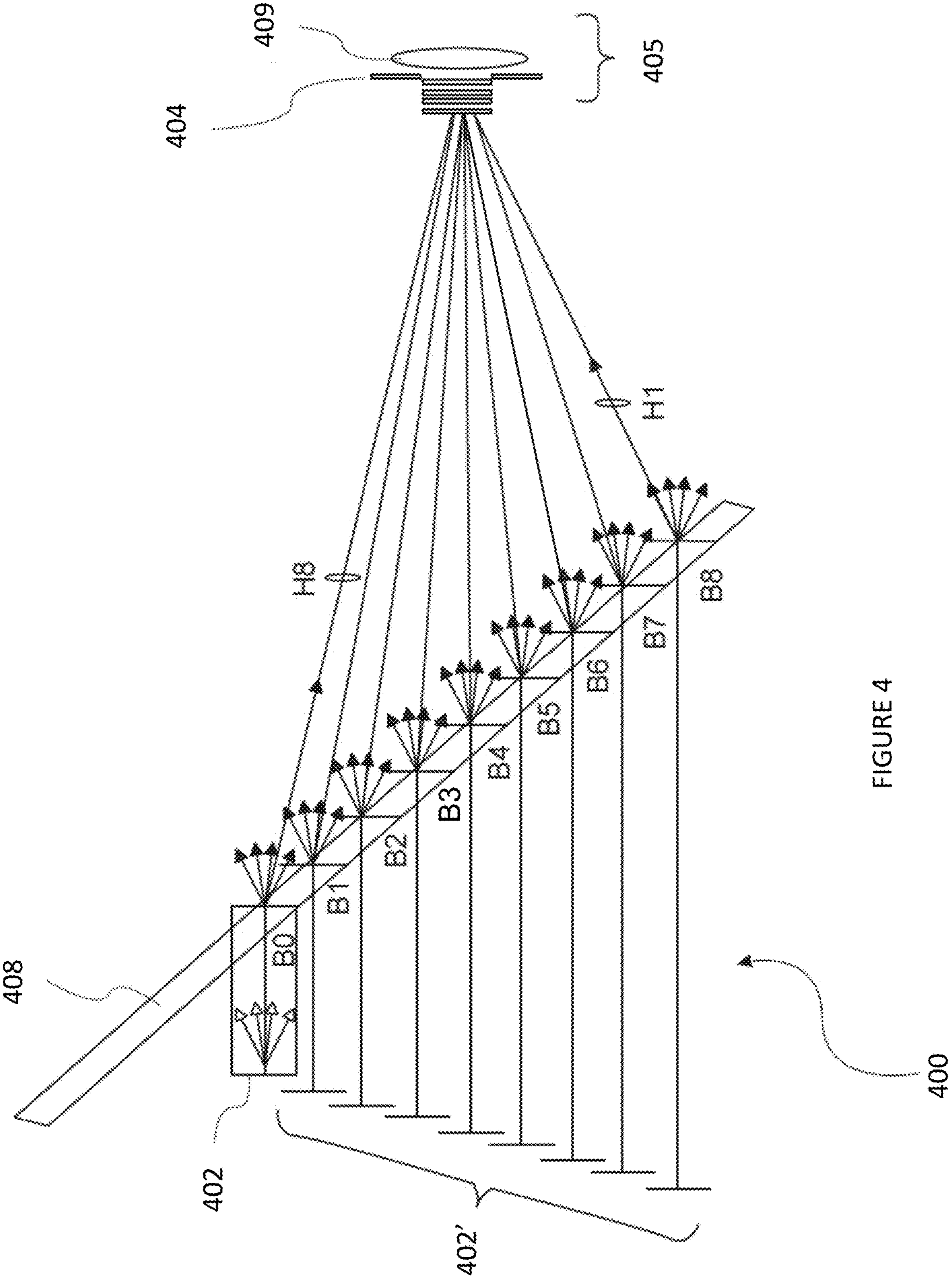
FIG. 4 shows a system, including a display device that displays a hologram that has been calculated as illustrated in FIGS. 2 and 3.

FIG. 4 shows a system 400, including a display device that displays a hologram that has been calculated as illustrated in FIGS. 2 and 3.

The system 400 comprises a display device, which in this arrangement comprises an LCOS 402. The LCOS 402 is arranged to display a modulation pattern (or 'diffractive pattern') comprising the hologram and to project light that has been holographically encoded towards an eye 405 that comprises a pupil that acts as an aperture 404, a lens 409, and a retina (not shown) that acts as a viewing plane. There is a light source (not shown) arranged to illuminate the LCOS 402. The lens 409 of the eye 405 performs a hologram-to-image transformation. The light source may be of any suitable type. For example, it may comprise a laser light source.

The viewing system 400 further comprises a waveguide 408 positioned between the LCOS 402 and the eye 405. The presence of the waveguide 408 enables all angular content from the LCOS 402 to be received by the eye, even at the relatively large projection distance shown. This is because the waveguide 508 acts as a pupil expander, in a manner that is well known and so is described only briefly herein.

In brief, the waveguide 408 shown in FIG. 4 comprises a substantially elongate formation. In this example, the waveguide 408 comprises an optical slab of refractive material, but other types of waveguide are also well known and may be used. The waveguide 408 is located so as to intersect the light cone (i.e., the diffracted light field) that is projected from the LCOS 402, for example at an oblique angle. In this example, the size, location, and position of the waveguide 408 are configured to ensure that light from each of the eight ray bundles, within the light cone, enters the waveguide 408. Light from the light cone enters the waveguide 408 via its first planar surface (located nearest the LCOS 402) and is guided at least partially along the length of the waveguide 408, before being emitted via its second planar surface, substantially opposite the first surface (located nearest the eye). As will be well understood, the second planar surface is partially reflective, partially transmissive. In other words, when each ray of light travels within the waveguide 408 from the first planar surface and hits the second planar surface, some of the light will be transmitted out of the waveguide 408 and some will be reflected by the second planar surface, back towards the first planar surface. The first planar surface is reflective, such that all light that hits it, from within the waveguide 408, will be reflected back towards the second planar surface. Therefore, some of the light may simply be refracted between the two planar surfaces of the waveguide 408 before being transmitted, whilst other light may be reflected, and thus may undergo one or more reflections, (or 'bounces') between the planar surfaces of the waveguide 408, before being transmitted.

FIG. 4 shows a total of nine "bounce" points, B0 to B8, along the length of the waveguide 408. Although light relating to all points of the image (V1-V8) as shown in FIG. 2 is transmitted out of the waveguide at each "bounce" from the second planar surface of the waveguide 408, only the light from one angular part of the image (e.g. light of one of V1 to V8) has a trajectory that enables it to reach the eye 405, from each respective "bounce" point, B0 to B8. Moreover, light from a different angular part of the image, V1 to V8, reaches the eye 405 from each respective "bounce" point. Therefore, each angular channel of encoded light reaches the eye only once, from the waveguide 408, in the example of FIG. 4.

The waveguide 408 forms a plurality of replicas of the hologram, at the respective "bounce" points B1 to B8 along its length, corresponding to the direction of pupil expansion. As shown in FIG. 4, the plurality of replicas may be extrapolated back, in a straight line, to a corresponding plurality of replica or virtual display devices 402'. This process corresponds to the step of "unfolding" an optical path within the waveguide, so that a light ray of a replica is extrapolated back to a "virtual surface" without internal reflection within the waveguide. Thus, the light of the expanded exit pupil may be considered to originate from a virtual surface (also called an "extended modulator" herein) comprising the display device 402 and the replica display devices 402'.

Although virtual images, which require the eye to transform received modulated light in order to form a perceived image, have generally been discussed herein, the methods and arrangements described herein can be applied to real images.

Two-Dimensional Pupil Expansion

Whilst the arrangement shown in FIG. 4 includes a single waveguide that provides pupil expansion in one dimension, pupil expansion can be provided in more than one dimension, for example in two dimensions. Moreover, whilst the example in FIG. 4 uses a hologram that has been calculated to create channels of light, each corresponding to a different portion of an image, the present disclosure and the systems that are described herebelow are not limited to such a hologram type.

Figure 5A:
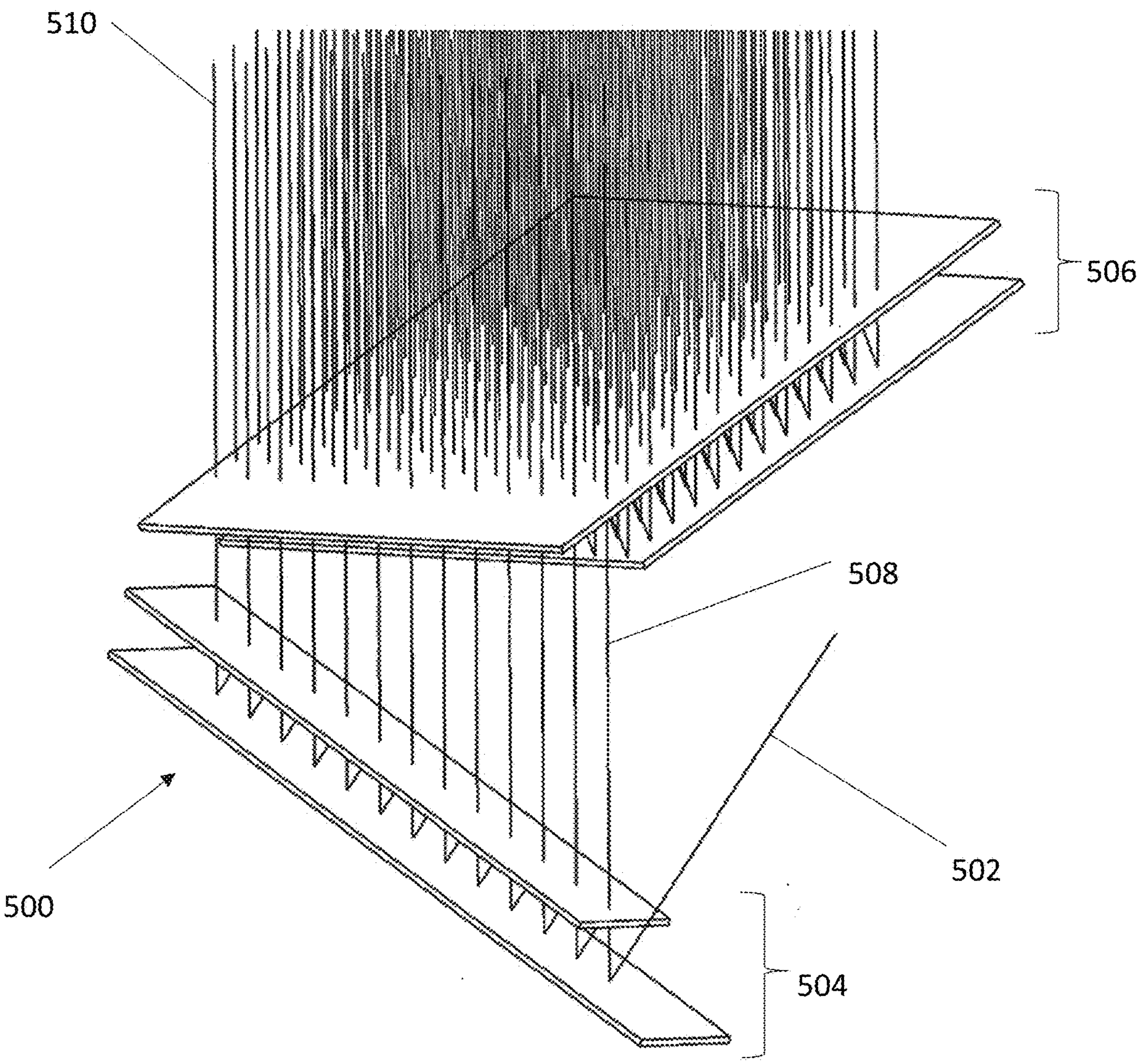
FIG. 5A shows a perspective view of a first example two-dimensional pupil expander comprising two replicators each comprising pairs of stacked surfaces.

FIG. 5A shows a perspective view of a system 500 comprising two replicators, 504, 506 arranged for expanding a light beam 502 in two dimensions.

In the system 500 of FIG. 5A, the first replicator 504 comprises a first pair of surfaces, stacked parallel to one another, and arranged to provide replication—or, pupil expansion—in a similar manner to the waveguide 408 of FIG. 4. The first pair of surfaces are similarly (in some cases, identically) sized and shaped to one another and are substantially elongate in one direction. The collimated light beam 502 is directed towards an input on the first replicator 504. Due to a process of internal reflection between the two surfaces, and partial transmission of light from each of a plurality of output points on one of the surfaces (the upper surface, as shown in FIG. 5A), which will be familiar to the skilled reader, light of the light beam 502 is replicated in a first direction, along the length of the first replicator 504. Thus, a first plurality of replica light beams 508 is emitted from the first replicator 504, towards the second replicator 506.

The second replicator 506 comprises a second pair of surfaces stacked parallel to one another, arranged to receive each of the collimated light beams of the first plurality of light beams 508 and further arranged to provide replication—or, pupil expansion—by expanding each of those light beams in a second direction, substantially orthogonal to the first direction. The first pair of surfaces are similarly (in some cases, identically) sized and shaped to one another and are substantially rectangular. The rectangular shape is implemented for the second replicator in order for it to have length along the first direction, in order to receive the first plurality of light beams 508, and to have length along the second, orthogonal direction, in order to provide replication in that second direction. Due to a process of internal reflection between the two surfaces, and partial transmission of light from each of a plurality of output points on one of the surfaces (the upper surface, as shown in FIG. 5A), light of each light beam within the first plurality of light beams 508 is replicated in the second direction. Thus, a second plurality of light beams 510 is emitted from the second replicator 506, wherein the second plurality of light beams 510 comprises replicas of the input light beam 502 along each of the first direction and the second direction. Thus, the second plurality of light beams 510 may be regarded as comprising a two-dimensional grid, or array, of replica light beams.

Thus, it can be said that the first and second replicators 504, 505 of FIG. 5A combine to provide a two-dimensional replicator (or, "two-dimensional pupil expander"). Thus, the replica light beams 510 may be emitted along an optical path to an expanded eye-box of a display system, such as a head-up display.

In the system of FIG. 5A, the first replicator 504 is a waveguide comprising a pair of elongate rectilinear reflective surfaces, stacked parallel to one another, and, similarly, the second replicator 504 is a waveguide comprising a pair of rectangular reflective surfaces, stacked parallel to one another. In other systems, the first replicator may be a solid elongate rectilinear waveguide and the second replicator may be a solid planar rectangular shaped waveguide, wherein each waveguide comprises an optically transparent solid material such as glass. In this case, the pair of parallel reflective surfaces are formed by a pair of opposed major sidewalls optionally comprising respective reflective and reflective-transmissive surface coatings, familiar to the skilled reader.

Figure 5B:
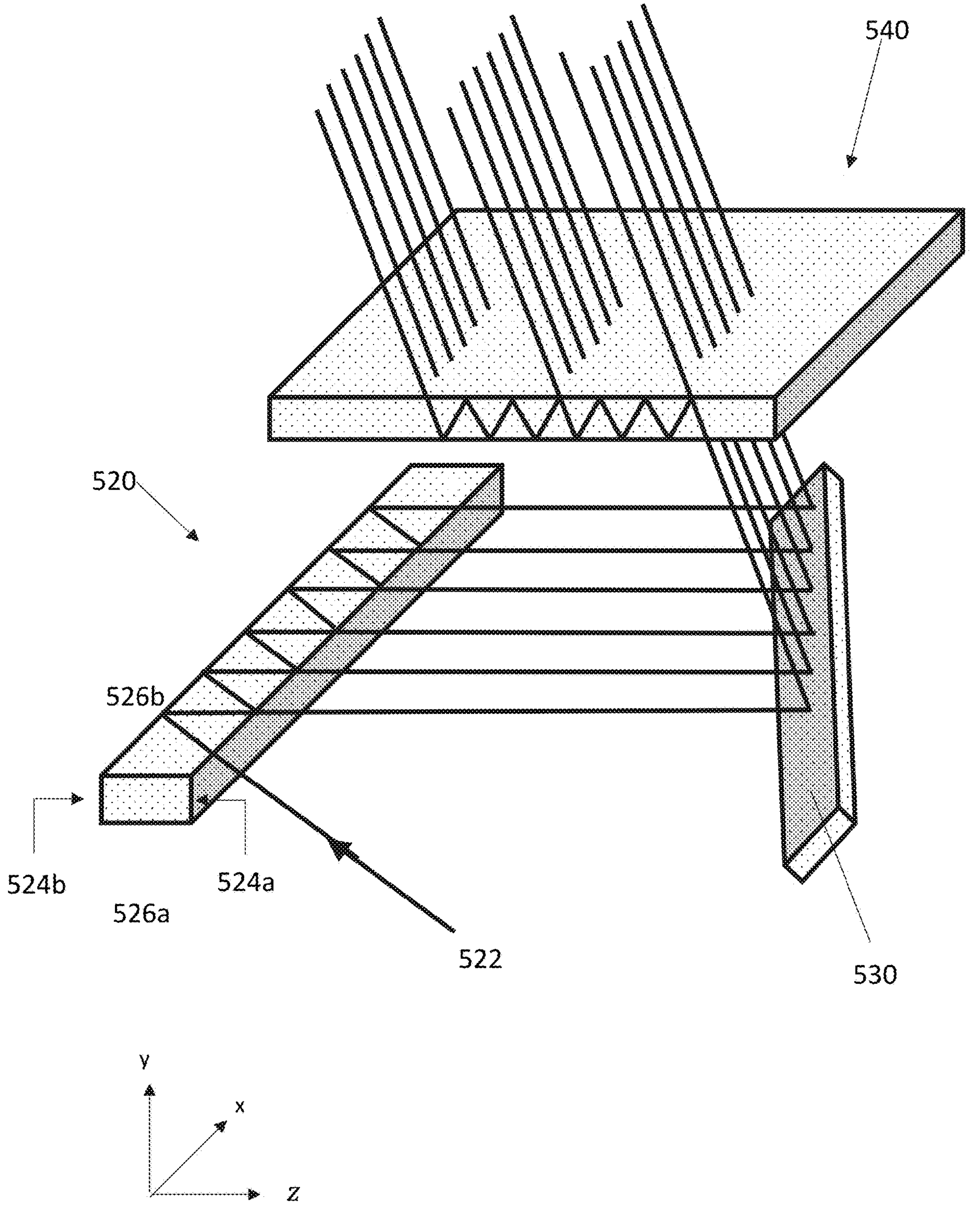
FIG. 5B shows a perspective view of a first example two-dimensional pupil expander.

FIG. 5B shows a perspective view of a system 500 comprising two replicators, 520, 540 arranged for replicating a light beam 522 in two dimensions, in which the first replicator is a solid elongated waveguide 520 and the second replicator is a solid planar waveguide 540.

In the system of FIG. 5B, the first replicator/waveguide 520 is arranged so that its pair of elongate parallel reflective surfaces 524*a*, 524*b* are perpendicular to the plane of the second replicator/waveguide 540. Accordingly, the system comprises an optical coupler arranged to couple light from an output port of first replicator 520 into an input port of the second replicator 540. In the illustrated arrangement, the optical coupler is a planar/fold mirror 530 arranged to fold or turn the optical path of light to achieve the required optical coupling from the first replicator to the second replicator. As shown in FIG. 5B, the mirror 530 is arranged to receive light-comprising a one-dimensional array of replicas extending in the first dimension—from the output port/reflective-transmissive surface 524*a* of the first replicator/waveguide 520. The mirror 530 is tilted so as to redirect the received light onto an optical path to an input port in the (fully) reflective surface of second replicator 540 at an angle to provide waveguiding and replica formation, along its length in the second dimension. It will be appreciated that the mirror 530 is one example of an optical element that can redirect the light in the manner shown, and that one or more other elements may be used instead, to perform this task.

In the illustrated arrangement, the (partially) reflective-transmissive surface 524*a* of the first replicator 520 is adjacent the input port of the first replicator/waveguide 520 that receives input beam 522 at an angle to provide waveguiding and replica formation, along its length in the first dimension. Thus, the input port of first replicator/waveguide 520 is positioned at an input end thereof at the same surface as the reflective-transmissive surface 524*a*. The skilled reader will understand that the input port of the first replicator/waveguide 520 may be at any other suitable position.

Accordingly, the arrangement of FIG. 5B enables the first replicator 520 and the mirror 530 to be provided as part of a first relatively thin layer in a plane in the first and third dimensions (illustrated as an x-z plane). In particular, the size or "height" of a first planar layer—in which the first replicator 520 is located—in the second dimension (illustrated as the y dimension) is reduced. The mirror 530 is configured to direct the light away from a first layer/plane, in which the first replicator 520 is located (i.e. the "first planar layer"), and direct it towards a second layer/plane, located above and substantially parallel to the first layer/plane, in which the second replicator 540 is located (i.e. a "second planar layer"). Thus, the overall size or "height" of the system—comprising the first and second replicators 520, 540 and the mirror 530 located in the stacked first and second planar layers in the first and third dimensions (illustrated as an x-z plane)—in the second dimension (illustrated as the y dimension) is compact. The skilled reader will understand that many variations of the arrangement of FIG. 5B for implementing the present disclosure are possible and contemplated.

The image projector may be arranged to project a diverging or diffracted light field. In some embodiments, the light field is encoded with a hologram. In some embodiments, the diffracted light field comprises diverging ray bundles. In some embodiments, the image formed by the diffracted light field is a virtual image.

In some embodiments, the first pair of parallel/complementary surfaces are elongate or elongated surfaces, being relatively long along a first dimension and relatively short along a second dimension, for example being relatively short along each of two other dimensions, with each dimension being substantially orthogonal to each of the respective others. The process of reflection/transmission of the light between/from the first pair of parallel surfaces is arranged to cause the light to propagate within the first waveguide pupil expander, with the general direction of light propagation being in the direction along which the first waveguide pupil expander is relatively long (i.e., in its "elongate" direction).

There is disclosed herein a system that forms an image using diffracted light and provides an eye-box size and field of view suitable for real-world application—e.g. in the automotive industry by way of a head-up display. The diffracted light is light forming a holographic reconstruction of the image from a diffractive structure—e.g. hologram such as a Fourier or Fresnel hologram. The use diffraction and a diffractive structure necessitates a display device with a high density of very small pixels (e.g. 1 micrometer)—which, in practice, means a small display device (e.g. 1 cm). The inventors have addressed a problem of how to provide 2D pupil expansion with a diffracted light field e.g. diffracted light comprising diverging (not collimated) ray bundles.

In some embodiments, the display system comprises a display device—such as a pixelated display device, for example a spatial light modulator (SLM) or Liquid Crystal on Silicon (LCoS) SLM—which is arranged to provide or form the diffracted or diverging light. In such aspects, the aperture of the spatial light modulator (SLM) is a limiting aperture of the system. That is, the aperture of the spatial light modulator—more specifically, the size of the area delimiting the array of light modulating pixels comprised within the SLM—determines the size (e.g. spatial extent) of the light ray bundle that can exit the system. In accordance with this disclosure, it is stated that the exit pupil of the system is expanded to reflect that the exit pupil of the system (that is limited by the small display device having a pixel size for light diffraction) is made larger or bigger or greater in spatial extend by the use of at least one pupil expander.

The diffracted or diverging light field may be said to have "a light field size", defined in a direction substantially orthogonal to a propagation direction of the light field. Because the light is diffracted/diverging, the light field size increases with propagation distance.

In some embodiments, the diffracted light field is spatially-modulated in accordance with a hologram. In other words, in such aspects, the diffractive light field comprises a "holographic light field". The hologram may be displayed on a pixelated display device. The hologram may be a computer-generated hologram (CGH). It may be a Fourier hologram or a Fresnel hologram or a point-cloud hologram or any other suitable type of hologram. The hologram may, optionally, be calculated so as to form channels of hologram light, with each channel corresponding to a different respective portion of an image that is intended to be viewed (or perceived, if it is a virtual image) by the viewer. The pixelated display device may be configured to display a plurality of different holograms, in succession or in sequence. Each of the aspects and embodiments disclosed herein may be applied to the display of multiple holograms.

The output port of the first waveguide pupil expander may be coupled to an input port of a second waveguide pupil expander. The second waveguide pupil expander may be arranged to guide the diffracted light field—including some of, preferably most of, preferably all of, the replicas of the light field that are output by the first waveguide pupil expander—from its input port to a respective output port by internal reflection between a third pair of parallel surfaces of the second waveguide pupil expander.

The first waveguide pupil expander may be arranged to provide pupil expansion, or replication, in a first direction and the second waveguide pupil expander may be arranged to provide pupil expansion, or replication, in a second, different direction. The second direction may be substantially orthogonal to the first direction. The second waveguide pupil expander may be arranged to preserve the pupil expansion that the first waveguide pupil expander has provided in the first direction and to expand (or, replicate) some of, preferably most of, preferably all of, the replicas that it receives from the first waveguide pupil expander in the second, different direction. The second waveguide pupil expander may be arranged to receive the light field directly or indirectly from the first waveguide pupil expander. One or more other elements may be provided along the propagation path of the light field between the first and second waveguide pupil expanders.

The first waveguide pupil expander may be substantially elongated and the second waveguide pupil expander may be substantially planar. The elongated shape of the first waveguide pupil expander may be defined by a length along a first dimension. The planar, or rectangular, shape of the second waveguide pupil expander may be defined by a length along a first dimension and a width, or breadth, along a second dimension substantially orthogonal to the first dimension. A size, or length, of the first waveguide pupil expander along its first dimension make correspond to the length or width of the second waveguide pupil expander along its first or second dimension, respectively. A first surface of the pair of parallel surfaces of the second waveguide pupil expander, which comprises its input port, may be shaped, sized, and/or located so as to correspond to an area defined by the output port on the first surface of the pair of parallel surfaces on the first waveguide pupil expander, such that the second waveguide pupil expander is arranged to receive each of the replicas output by the first waveguide pupil expander.

The first and second waveguide pupil expander may collectively provide pupil expansion in a first direction and in a second direction perpendicular to the first direction, optionally, wherein a plane containing the first and second directions is substantially parallel to a plane of the second waveguide pupil expander. In other words, the first and second dimensions that respectively define the length and breadth of the second waveguide pupil expander may be parallel to the first and second directions, respectively, (or to the second and first directions, respectively) in which the waveguide pupil expanders provide pupil expansion. The combination of the first waveguide pupil expander and the second waveguide pupil expander may be generally referred to as being a "pupil expander".

It may be said that the expansion/replication provided by the first and second waveguide expanders has the effect of expanding an exit pupil of the display system in each of two directions. An area defined by the expanded exit pupil may, in turn define an expanded eye-box area, from which the viewer can receive light of the input diffracted or diverging light field. The eye-box area may be said to be located on, or to define, a viewing plane.

The two directions in which the exit pupil is expanded may be coplanar with, or parallel to, the first and second directions in which the first and second waveguide pupil expanders provide replication/expansion. Alternatively, in arrangements that comprise other elements such as an optical combiner, for example the windscreen (or, windshield) of a vehicle, the exit pupil may be regarded as being an exit pupil from that other element, such as from the windscreen. In such arrangements, the exit pupil may be non-coplanar and non-parallel with the first and second directions in which the first and second waveguide pupil expanders provide replication/expansion. For example, the exit pupil may be substantially perpendicular to the first and second directions in which the first and second waveguide pupil expanders provide replication/expansion.

The viewing plane, and/or the eye-box area, may be non-coplanar or non-parallel to the first and second directions in which the first and second waveguide pupil expanders provide replication/expansion. For example, a viewing plane may be substantially perpendicular to the first and second directions in which the first and second waveguide pupil expanders provide replication/expansion.

In order to provide suitable launch conditions to achieve internal reflection within the first and second waveguide pupil expanders, an elongate dimension of the first waveguide pupil expander may be tilted relative to the first and second dimensions of the second waveguide pupil expander.

Combiner Shape Compensation

An advantage of projecting a hologram to the eye-box is that optical compensation can be encoded in the hologram (see, for example, European patent 2936252 incorporated herein by herein). The present disclosure is compatible with holograms that compensate for the complex curvature of an optical combiner used as part of the projection system. In some embodiments, the optical combiner is the windscreen of a vehicle. Full details of this approach are provided in European patent 2936252 and are not repeated here because the detailed features of those systems and methods are not essential to the new teaching of this disclosure herein and are merely exemplary of configurations that benefit from the teachings of the present disclosure.

Control Device

The present disclosure is also compatible with optical configurations that include a control device (e.g. light shuttering device) to control the delivery of light from a light channelling hologram to the viewer. The holographic projector may further comprise a control device arranged to control the delivery of angular channels to the eye-box position. British patent application 2108456.1, filed 14 Jun. 2021 and incorporated herein by reference, discloses the at least one waveguide pupil expander and control device. The reader will understand from at least this prior disclosure that the optical configuration of the control device is fundamentally based upon the eye-box position of the user and is compatible with any hologram calculation method that achieves the light channeling described herein. It may be said that the control device is a light shuttering or aperturing device. The light shuttering device may comprise a 1D array of apertures or windows, wherein each aperture or window independently switchable between a light transmissive and a light non-transmissive state in order to control the delivery of hologram light channels, and their replicas, to the eye-box. Each aperture or window may comprise a plurality of liquid crystal cells or pixels.

Eye-Tracking

Figure 6:
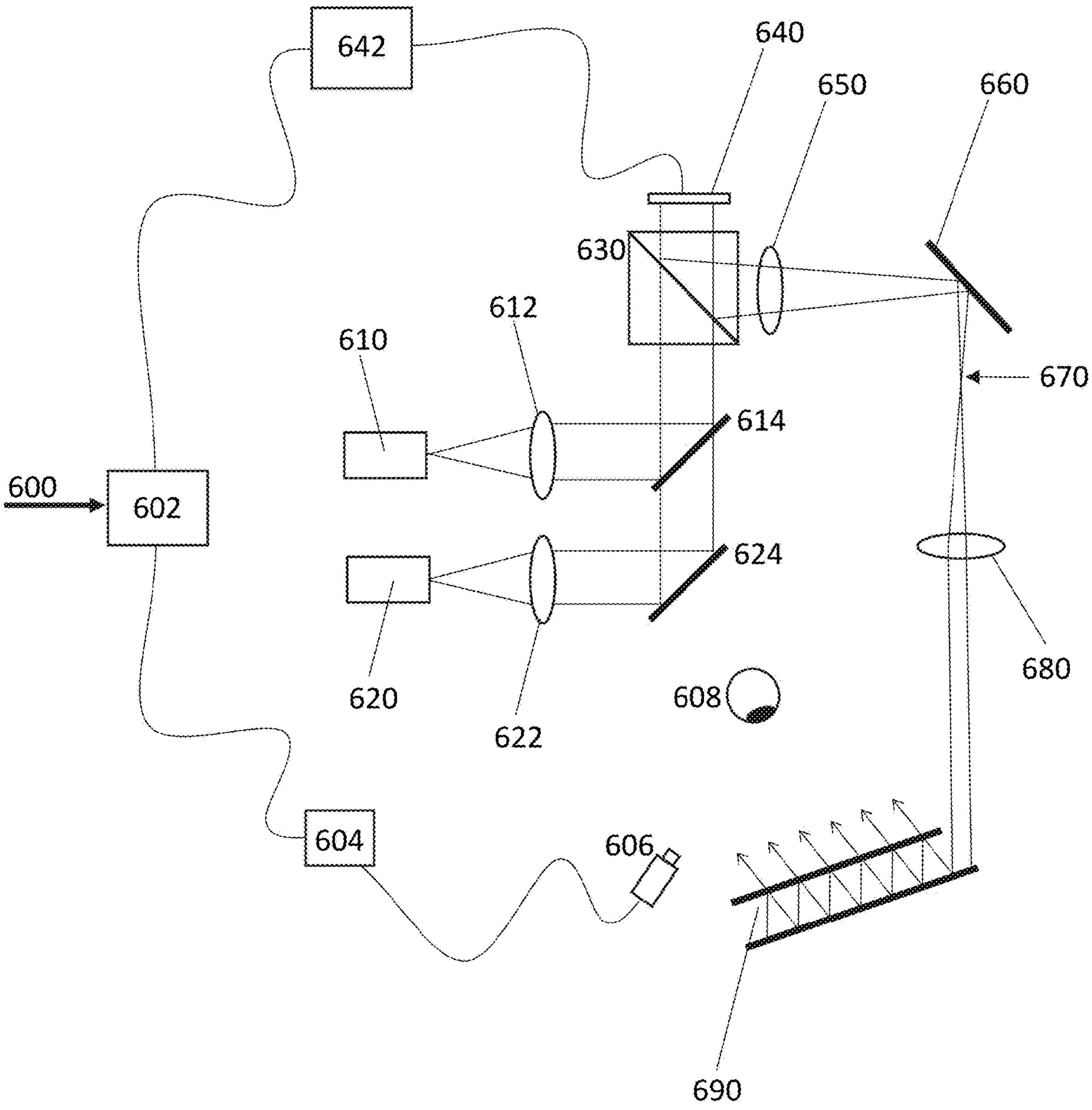
FIG. 6 shows an example of a head-up display comprising a waveguide and an eye-tracker.

Some holographic display devices include user tracking such as eye-tracking, using an eye-tracking device. FIG. 6 shows an example of such a holographic display device comprising a waveguide forming a waveguide pupil expander and further comprising an eye-tracking device. Such holographic display devices may be arranged to receive an input from the user/eye tracking device. The holographic display device may be arranged to determine a current position of the user (or the eye or eyes of a user) based on the input, for example. The holographic display device may be arranged to calculate, recalculate or modify a hologram to be displayed by the holographic display device based on this determined position. An example of this is described in relation to FIG. 6.

In the example of FIG. 6, the holographic display device comprises a picture generating unit arranged to form a first picture (also called "first image") and a second picture (also called "second image"). In this example, a first single colour channel (also called "first display channel") is arranged to form the first picture and comprises a first light source 610, a first collimating lens 612 and a first dichroic mirror 614. First dichroic mirror 614 is arranged to reflect light of a first wavelength along a common optical path so as to illuminate a spatial light modulator (SLM) 640. The first wavelength of light corresponds to the first display channel of a first colour (e.g. red). A second single colour channel (also called "second display channel") is arranged to form the second picture and comprises a second light source 620, a second collimating lens 622 and a second mirror 624. Second mirror 624 is arranged to reflect light of a second wavelength along the common optical path so as to illuminate the SLM 640. The second wavelength of light corresponds to the second single colour channel of a second colour (e.g. green). In other embodiments, the picture generating unit may comprises a third single colour/display channel (equivalent to the first and second channels) arranged to form a third picture, wherein the third colour channel corresponds to a wavelength of light of a third colour (e.g. blue). In the illustrated embodiment, SLM 640 comprises a single array of light modulating pixels (e.g. LCOS) that is illuminated by light of both the first and second wavelengths. In other embodiments, SLM 640 may comprise separate arrays of light modulating pixels that are illuminated by light of the respective first and second wavelengths.

Holographic display device further comprises a holographic controller 602 arranged to control the picture generating unit, specifically the light output by picture generating unit as described herein. First spatially modulated light of the first colour corresponding to the first picture is output by SLM 640 to form a first single colour image (e.g. red image). A first single colour computer-generated hologram is calculated by a holographic controller 602 and encoded on SLM 640, for example by a display driver 642. The SLM 640 displays the first hologram and is illuminated by light of the first colour from the first colour/display channel to form a first holographic reconstruction at an intermediate plane 670 which may also be referred to as a replay plane. Similarly, second spatially modulated light of the second colour corresponding to the second picture is output by SLM 640 to form a second single colour image (e.g. green image) at the intermediate 670. A second single colour computer-generated hologram is encoded on SLM 640 by holographic controller 602. The SLM 640 displays the second hologram and is illuminated by light of the second colour from the second colour/display channel to form a second holographic reconstruction at the replay plane. In the illustrated arrangement, a beam splitter cube 630 is arranged to separate input light to SLM 640 and spatially modulated light output by SLM 640. A Fourier lens 650 and mirror 660 are provided in the optical path of the output spatially modulated light to the intermediate plane 670. Thus, a composite colour reconstruction may be formed at the intermediate plane 670. A second lens 680 is arranged to project the first and second pictures formed on the light receiving surface 672 to an input port of a pupil expander in the form of a waveguide 690. A viewer 608 may receive spatially modulated light from the expanded eye box—the "viewing window"—formed by waveguide 690. Waveguide 690 comprises an optically transparent medium separated by first and second reflective surfaces as described above with reference to FIG. 4. Thus, holographic display device has a "direct view" configuration—that is the viewer directly receives spatially modulated light that has been modulated in accordance with a picture, rather than image light.

The holographic display device further comprises a viewer-tracking system comprising an eye tracking camera 606 and an eye tracking controller 604. As known in the art, the eye tracking camera is arranged to capture images of the eye(s) of the viewer for tracking the eye position, and thus the viewing position within the viewing window. Eye tracking controller 604 provides feedback to holographic controller 602 indicating the current viewing position. An improved eye tracking system is disclosed in the applicant's UK patent application number 2318704.0, which is incorporated herein in its entirety by reference.

User Positioning Feedback

Figure 7:
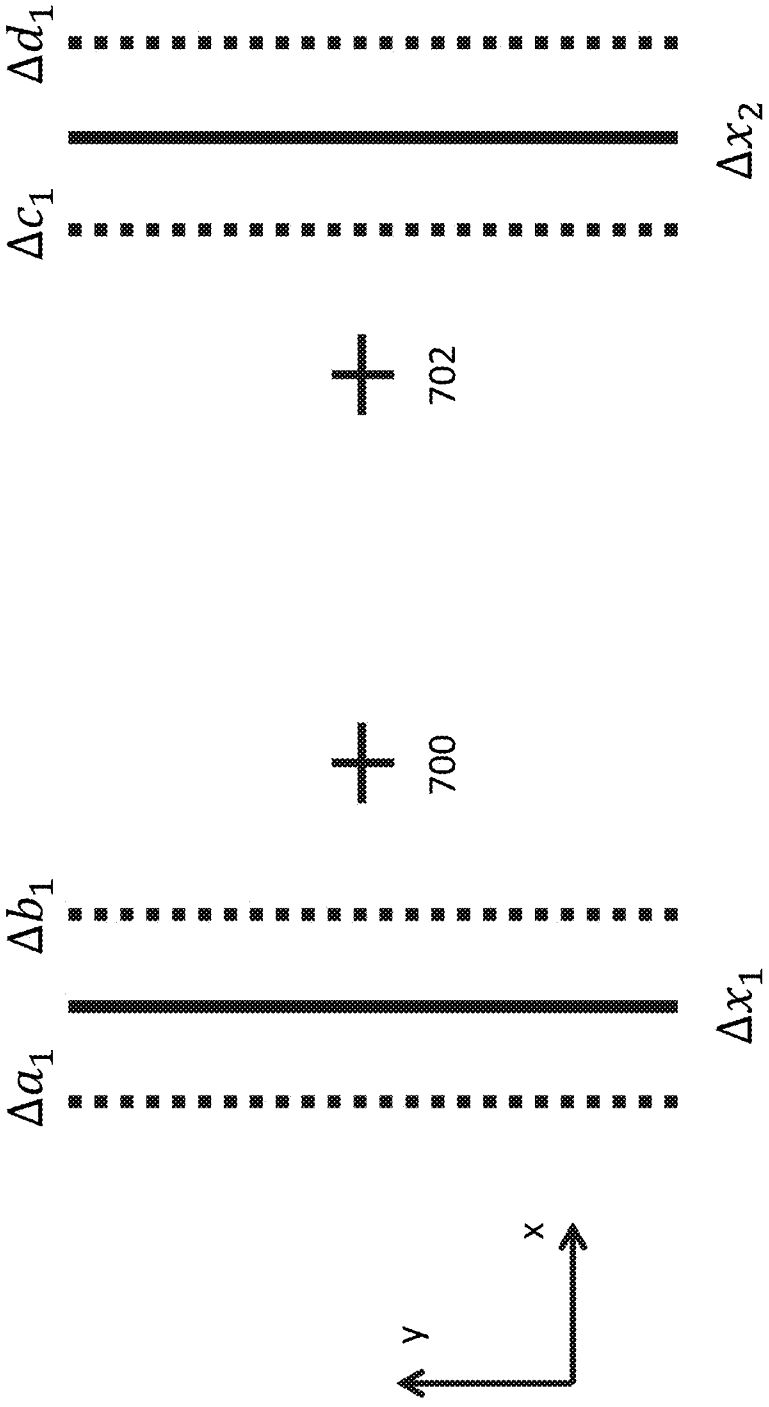
FIG. 7 shows a schematic view of an improved eye-tracking method according to the present disclosure.

FIG. 7 shows a schematic representation of an eye-tracking method according to the present disclosure. The plane of FIG. 7 represents the plane of the viewing window/ eye-box as described above. The x-direction is equivalent to the user/viewer looking from left to right and the y-direction is equivalent to the user looking up and down.

The user has a primary (or optimum) left eye position 700 and a primary (or optimum) right eye position 702 in relation to the plane of the eye-box/viewing window. By primary eye position it is meant the eye position that is the optimum eye position for the user to perceive the displayed image. In this case, the optimum eye positions are such that the user is positioned in the centre of the eye-box. This gives the user the greatest degree of freedom of movement before reaching an edge of the eye-box and reduces the appearance of artefacts to the user (that may be more present towards the edges of the eye-box). The embodiments herein are described with reference to eyes of a (human) user, however the skilled person would understand that the invention would also function for an artificial equivalent (such as, for example, a camera for testing purposes).

The edges of the eye-box, the first (i.e. left) edge Δx1 and the second (i.e. right) edge Δx2 are shown in FIG. 7, however it will be understood by the skilled person that the invention could also be applied to the top and bottom edges (not shown) of the eye-box—FIG. 7 only deals with the edges Δx1, Δx2 in the x-direction for simplicity. As would also be understood by the skilled person, the edges Δx1, Δx2 of the eye-box are chosen as the area within which the displayed image will be perceived by the user within the tolerances deemed acceptable (e.g. with regards to the image quality, presence of artefacts, etc.).

Surrounding each edge Δx1, Δx2 there is a threshold formed of two threshold distances. The left edge Δx1 has a first threshold distance Δa1 and a second threshold distance Δb1. Thus, the threshold around the left edge Δx1 is equal to Δa1+Δb1. Likewise, the right edge Δx2 has a third threshold distance Δc1 and a fourth threshold distance Δd1. Thus, the threshold around the right edge Δx2 is equal to Δc1+Δd1. The function of these thresholds is described below.

Figure 8:
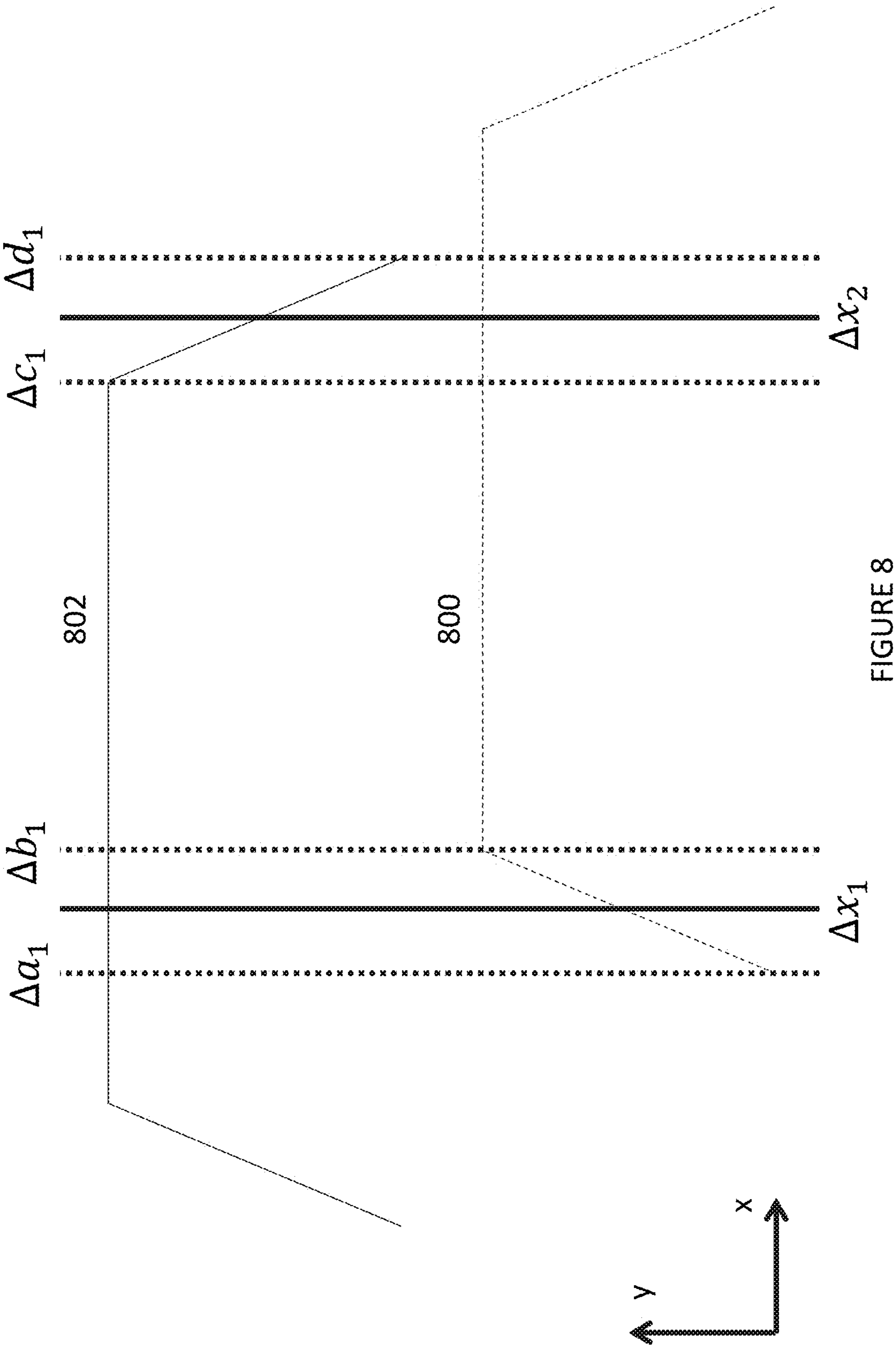
FIG. 8 shows a first schematic view of an eye-box guiding method according to the present disclosure.

FIG. 8 shows an example of the fade in and fade out of the displayed imaged experienced by each eye in the x-direction. In this Figure, the y-direction represents the intensity of the displayed image, with an increase in the y-direction representing an increase in intensity of the displayed image. The plots relating to each eye have been separated and displayed on top of one another (in the y-direction), but it will be understood (with reference to the discussion of FIG. 9 below) that this is purely schematic.

As can be seen in FIG. 8, the left eye observes the first (fade in and fade out) pattern (or profile) 800 whilst the right eye observes the second (fade in and fade out) pattern (or profile) 802. The first pattern 800 and second pattern 802 are each intensity profiles (or in other words, intensity variations). That is, as the user/viewer moves to the left, their eyes move away from the optimum eye positions 700, 702 and the left eye passes the second threshold distance Δb1. As it does so, the intensity of the displayed image observed by the left eye begins to reduce. The intensity of the displayed image observed by the left eye continues to reduce as the left eye moves in a negative x-direction until it is reduced to zero at the first threshold distance Δa1. Being within the second and third threshold distances Δb1, Δc1, the right eye still receives the displayed image at full intensity.

When the user moves so far to the left that the right eye passes the second threshold distance Δb1, the intensity of the displayed image observed by the right eye begins to reduce. The intensity of the displayed image observed by the right eye continues to reduce as the right eye moves in a negative x-direction until it is reduced to zero at the first threshold distance Δa1, as happened to the left eye. At this stage, the intensity of the displayed image being projected to both eyes is at zero, and so the user is unable to see the displayed image.

This naturally encourages the user to move their head back in a direction that will allow them to see the displayed image (i.e. to move their head back right, or in the positive x-direction). When the right eye moves in positive x-direction (i.e. back towards the optimum right eye position 702), as it reaches the first threshold distance Δa1 it will begin to once again perceive the displayed image. The intensity of the displayed image observed by the right eye continues to increase as the right eye moves in a positive x-direction until it is at full intensity at the second threshold distance Δb1.

As the user continues to move to the right, the left eye also moves in a positive x-direction (i.e. back towards the optimum left eye position 700). As the left eye reaches the first threshold distance Δa1 it will begin to once again perceive the display image. The intensity of the displayed image observed by the left eye continues to increase as the left eye moves in a positive x-direction until it is at full intensity at the second threshold distance Δb1. At this point, the displayed image is being projected to both eyes at maximum intensity, and so the user can see the displayed image clearly.

The same is true when the user moves to the right. Their eyes move away from the optimum eye positions 700, 702 and the right eye passes the third threshold distance Δc1. As it does so, the intensity of the displayed image observed by the right eye begins to reduce. The intensity of the displayed image observed by the right eye continues to reduce as the right eye moves in a positive x-direction until it is reduced to zero at the fourth threshold distance Δd1. Being within the second and third threshold distances Δb1, Δc1, the left eye still receives the displayed image at full intensity.

When the user moves so far to the right that the left eye passes the third threshold distance Δc1, the intensity of the displayed image observed by the left eye begins to reduce. The intensity of the displayed image observed by the left eye continues to reduce as the left eye moves in a positive x-direction until it is reduced to zero at the first threshold distance Δd1, as happened to the right eye. At this stage, the intensity of the displayed image being projected to both eyes is at zero, and so the user is unable to see the displayed image.

This, again, naturally encourages the user to move their head back in a direction that will allow them to see the displayed image (i.e. to move their head back left, or in the negative x-direction). When the left eye moves in negative x-direction (i.e. back towards the optimum left eye position 700), as it reaches the fourth threshold distance Δd1 it will begin to once again perceive the displayed image. The intensity of the displayed image observed by the left eye continues to increase as the left eye moves in a negative x-direction until it is at full intensity at the third threshold distance Δc1.

As the user continues to move to the left, the right eye also moves in a negative x-direction (i.e. back towards the optimum right eye position 702). As the right eye reaches the fourth threshold distance Δd1 it will begin to once again perceive the display image. The intensity of the displayed image observed by the right eye continues to increase as the right eye moves in a negative x-direction until it is at full intensity at the third threshold distance Δc1. At this point, the displayed image is being projected to both eyes at maximum intensity, and so the user can see the displayed image clearly.

This process naturally encourages the user to keep their head within the second and third threshold distances Δb1, Δc1 (i.e. away from the edges Δx1, Δx2 of the eye-box). As the user begins to notice the intensity of the displayed image reduce in one or both of their eyes, they will naturally realise that they have begun to drift away from the centre of the eye-box (i.e. away from the optimum viewing positions) and will correct themselves. The inventors have found that this process naturally helps users stay in positions relative to the eye-box where they can have the optimal viewing experience.

Figure 9:
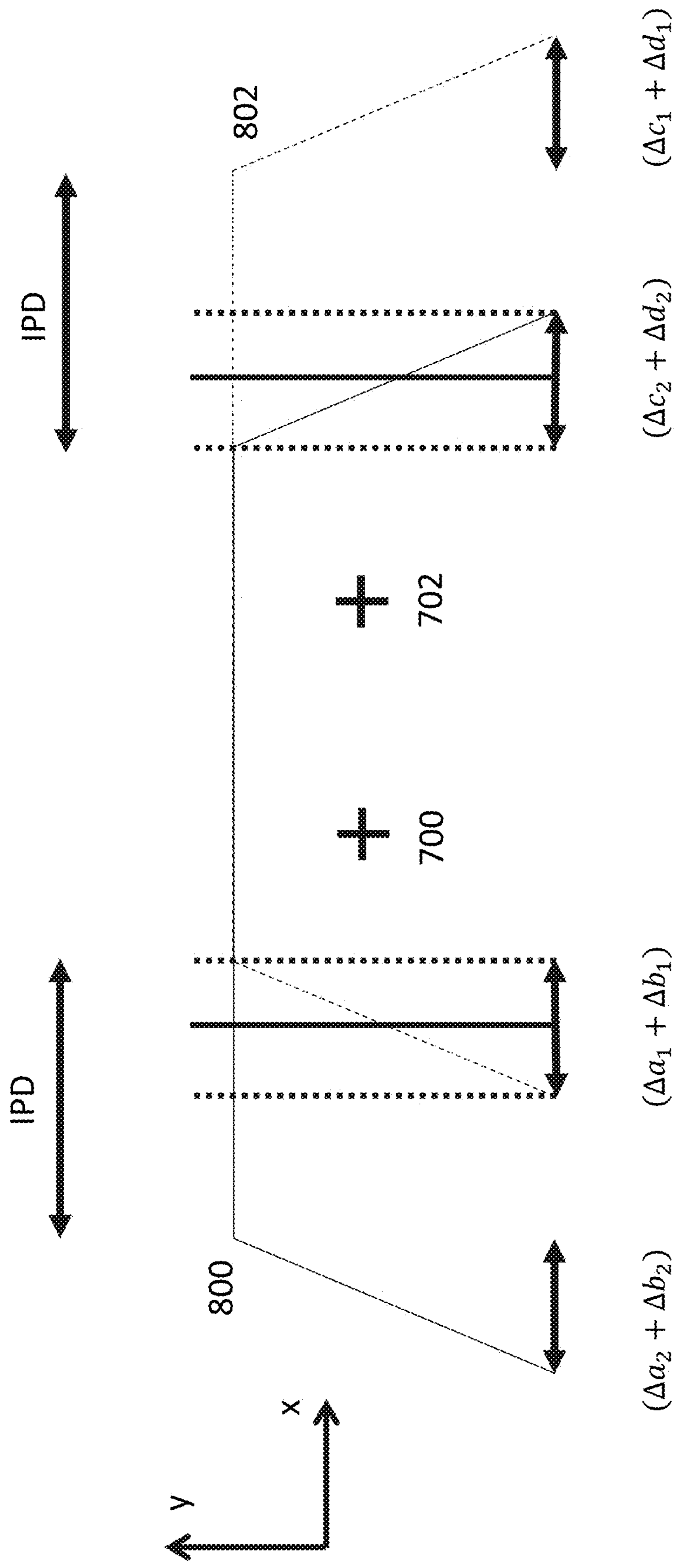
FIG. 9 shows a second schematic view of the method of FIG. 8.

FIG. 9 shows the first and second (fade in and out) patterns (or profiles) 800, 802 of the left and right eyes (as described above in relation to FIG. 8) as they would function in the eye-box/viewing window. The inter-pupillary distance (IPD), i.e. the distance between the pupils of the eyes of the user (or the distance between the optimum left and right eye positions 700, 702), will also be the distance between which the fading in or out of the displayed image will occur for the left and then the right eye when the user is moving to the left (or for the right eye and then the left eye when the user is moving to the right).

In other words, the threshold distances Δa1, Δb1, Δc1, Δd1 refer to the physical offsets that are used to calculate the ramp for reducing the intensity of the displayed image as the user moves towards the edges of the eye-box. If the values of these distances Δa1, Δb1, Δc1, Δd1 are all set to zero, then there will be no fade out or fade in and the image will instantly disappear once the user leaves the eye-box. These parameters Δa1, Δb1, Δc1, Δd1 can be configured for each eye independently, allowing the fade in and fade out experienced by each eye as it crosses each edge Δx1, Δx2 to be different. Alternatively, the parameters Δa1, Δb1, Δc1, Δd1 may be configured such that the fade in and fade out experienced by each eye is consistent as it crosses each edge Δx1, Δx2.

In a further embodiment (not shown), the first and fourth threshold distances Δa1, Δd1 are zero. In this embodiment, the fade out will occur before the respective eye reaches the edge Δx1, Δx2 of the eye-box. This will mean that the user will never be able to view content from outside of the eye-box (that, as described above, has been chosen to provide a sufficiently high quality image), but care must be taken that the second and third threshold distances Δb1, Δc1 are not too long, else there will only be a limited area of the eye-box without some level of intensity reduction.

In a yet further embodiment (also not shown), the fade in and fade out of the displayed image received by each eye is not based on the threshold distances Δa1, Δb1, Δc1, Δd1, but instead is based on the distance of the eye from its respective optimum eye position 700, 702. That is, rather than changing the intensity of the displayed image based on an eye position relative to a threshold surrounding an edge Δx1, Δx2 of the eye-box, the change in intensity of the displayed image is instead based on an eye position relative to its optimum position 700, 702. As with the embodiment discussed above in relation to FIGS. 7 to 9, the change in intensity of the display image helps guide the user back to the centre of the eye-box (i.e. naturally guides the user's eyes back to their optimum positions 700, 702).

In yet another embodiment (also not shown), the eye-box/viewing window is large enough to accommodate multiple users/viewers being displayed the same image. In this embodiment, the eye-box has a further defined "primary viewing area", in which it has been determined that only the "primary user" (e.g. the driver of a vehicle, if the head-up display is in a vehicle) can reasonably be positioned. An eye tracking system (for example the one as described above in relation to FIG. 6) monitors the eye-box for any eyes outside of the primary viewing area. Parts or all of the displayed image can then be faded in or out (as described herein) to all but the primary user in the primary viewing area. Thus, the system acts as a privacy filter for the displayed image.

In yet another embodiment (also not shown) that may be used alongside the embodiments described above, a fade in and fade out effect is also provided based on the detected position of the eyes relative to a plane of an ideal viewing area. That is, a display system will have an ideal viewing plane at a specific distance from said display system (such as from an optical combiner or windscreen, if the display system is in a vehicle). The eye tracking system can be used to detect the user's/viewer's position relative to the ideal viewing plane and implement the above described fade in and fade out effects if user/viewer moves too far away from said plane.

Figure 10A:
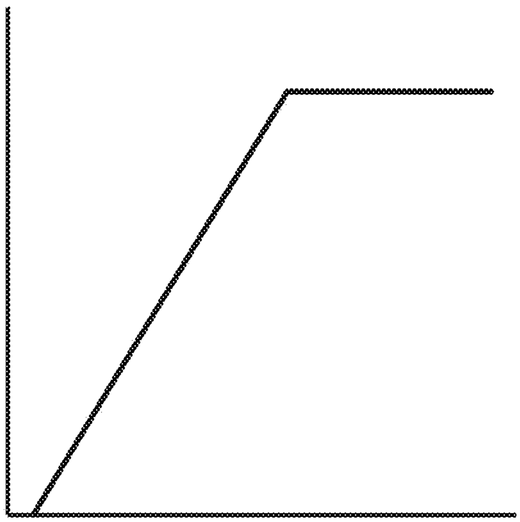
FIGS. 10A, 10B and 10C show embodiments of the fadeout of the eye-box guiding method of the present disclosure.
Figure 10B:
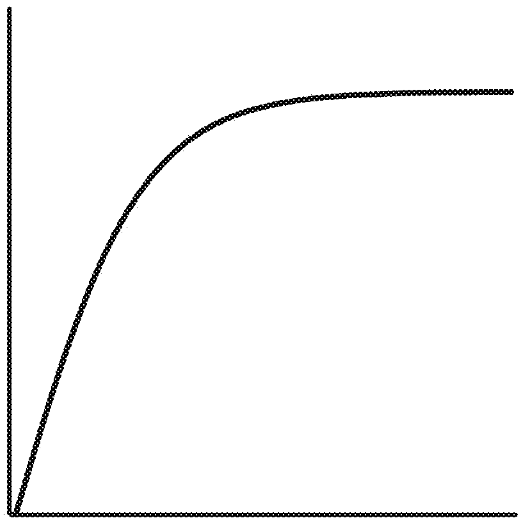
Figure 10C:
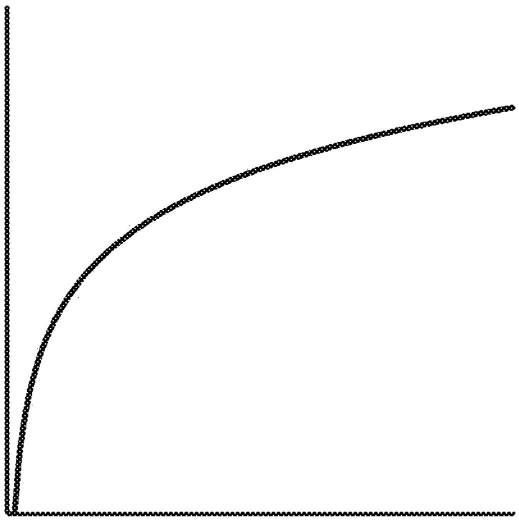

FIGS. 10A, 10B and 10C show different profiles of fading that could be applied to the embodiments discussed above and shown in FIGS. 7 to 9. On each chart, the x-axis represents the movement of the respective eye along the plane of the eye-box/viewing window relative to the respective edge Δx1, Δx2, the movement perpendicular to said edge Δx1, Δx2. Meanwhile, the y-axis represents the intensity of the displayed image, with the intensity increasing with an increase in the y-axis.

FIG. 10A shows the (intensity) profile of fading of the embodiment of FIGS. 8 and 9—that is a profile with a linear relationship between the movement of each eye relative the respective edge Δx1, Δx2 and intensity of the displayed image to that eye. FIG. 10B shows a profile with an exponential tangent relationship between the movement of each eye relative the respective edge Δx1, Δx2 and intensity of the displayed image to that eye. FIG. 10C shows a profile with a natural logarithmic relationship between the movement of each eye relative the respective edge Δx1, Δx2 and intensity of the displayed image to that eye.

The skilled person would understand that the relationship between the movement of each eye relative to the respective edge Δx1, Δx2 and intensity of the displayed image to that eye could be adjusted (including by using relationships beyond those given as examples here). That is, as well as the parameters Δa1, Δb1, Δc1, Δd1 being configured for each eye independently, the profile or relationship can be configured so that the fading is different for each eye and/or edge Δx1, Δx2. Furthermore, the threshold distances Δa1, Δb1, Δc1, Δd1 could be adjusted to further change the profile of the fade in and fade out of the displayed image. Thus, the skilled person would understand that it is possible to make the fade in and out of the displayed image more or less harsh as desired. Multiple options could be given to the user to allow them to choose a profile that best helps them stay in/near the centre of the eye-box (i.e. with their eyes close to the optimum eye positions 700, 702).

Each colour (i.e., wavelength) of light is modified at an equal rate. That is, a global fade in and fade out is provided to the entirety of the display image from the perspective of the viewer. The replicas (as described above) may all be changed together at the same rate. That is, the change in intensity experienced by each replica because of the above described method may be the same. The fade in and fade out effects may be achieved by applying an appropriate scaling factor to each point of the hologram (for example, in the hologram point cloud).

ADDITIONAL FEATURES

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A method comprising:

receiving a first signal indicating a first viewing position of a user within a viewing space of a head-up display, the user being a human user;

determining a first user-perceivable intensity for a first target image based on a distance between the first viewing position and a predetermined reference viewing position within the viewing space; and illuminating a first hologram corresponding to the first target image to holographically reconstruct the first target image at the first user-perceivable intensity;

then, receiving a second signal indicating a second viewing position of the user within the viewing space, wherein the second viewing position is different to the first viewing position; and determining a second user-perceivable intensity for a second target image based on a distance between the second viewing position and the predetermined reference viewing position within the viewing space;

illuminating a second hologram corresponding to the second target image to reconstruct the second target image at the second user-perceivable intensity;

wherein the second user-perceivable intensity is different to the first user-perceivable intensity, and a difference between the first user-perceivable intensity and the second user-perceivable intensity indicates to the user whether the second viewing position is closer to the predetermined reference viewing position or further from the predetermined reference viewing position compared to the first viewing position.

2. The method of claim 1, wherein the first target image is reconstructed within the viewing space by an eye of the user and the second target image is reconstructed within the viewing space by an eye of the user.

3. The method of claim 1, wherein the first target image is reconstructed at a diffuser of the head-up display to form a first reconstructed image, and the first reconstructed image is propagated to an eye of the user, and wherein the second target image is reconstructed at the diffuser of the head-up display to form a second reconstructed image, and the second reconstructed image is propagated to the eye of the user.

4. The method of claim 1, wherein the distance between the first viewing position and the predetermined reference viewing position within the viewing space is greater than the distance between the second viewing position and the predetermined reference viewing position within the viewing space, and wherein the second user-perceivable intensity is greater than the first user-perceivable intensity.

5. The method of claim 1, wherein the distance between the first viewing position and the predetermined reference viewing position within the viewing space is less than the distance between the second viewing position and the predetermined reference viewing position within the viewing space, and wherein the second user-perceivable intensity is less than the first user-perceivable intensity.

6. The method of claim 1, wherein the predetermined reference viewing position is in the center of the viewing space.

7. The method of claim 1, wherein the first target image comprises first image content and the second target image comprises second image content, and wherein the first image content is the same as the second image content.

8. The method of claim 1, wherein the viewing space is a three-dimensional space.

9. The method of claim 1, wherein the predetermined reference viewing position is a three-dimensional space or a 2-dimensional plane.

10. The method of claim 1, wherein the viewing space comprises a boundary, and wherein the second user-perceivable intensity communicates to the user whether the second viewing position is within a threshold distance of the boundary.

11. The method of claim 1, wherein reconstructing the first target image at the first user-perceivable intensity comprises at least one selected from the group comprising: changing a scaling factor of an algorithm arranged to calculate the first hologram of the first target image; changing a light source intensity of a light source used to illuminate the first hologram; and changing a polarisation angle of a light source used to illuminate the first hologram.

12. The method of claim 1, wherein reconstructing the second target image at the second user-perceivable intensity comprises at least one selected from the group comprising: changing a scaling factor of an algorithm arranged to calculate the second hologram of the second target image; changing a light source intensity of a light source used to illuminate the second hologram; and changing a polarisation angle of a light source used to illuminate the second hologram.

13. The method of claim 1, wherein the second user-perceivable intensity is determined such that the difference between the first user-perceivable intensity and the second user-perceivable intensity is based on a relationship between the difference between the first viewing position and the second viewing position, the relationship being selected from the group comprising: a linear relationship, an exponential tangent relationship, a natural logarithmic relationship, and a step function relationship.

14. The method of claim 1, wherein the first signal indicates that a first eye of the user is at the first viewing position, and wherein the second signal indicates that the first eye of the user is at the second viewing position.

15. The method of claim 1, wherein the first signal and the second signal are received from a driver monitoring system of a vehicle housing the head-up display.

16. The method of claim 1, wherein the first user-perceivable intensity and the second user-perceivable intensity are determined according to a function that has a monotonically-decreasing user-perceivable intensity with distance from the predetermined viewing position.

17. The method of claim 1, wherein the first user-perceivable intensity and the second user-perceivable intensity are determined according to a function that has a monotonically-changing user-perceivable intensity with distance from the predetermined viewing position.

18. A head-up display comprising:

a controller arranged to receive
  a first target image,
  a second target image,
  a first signal indicating a first viewing position of a user within a viewing space of the head-up display, the user being a human user, and
  a second signal indicating a second viewing position of the user within the viewing space of the head-up display; and
a holographic projector connected to the controller, wherein the holographic projector comprises a spatial light modulator and at least one light source;
wherein the controller is configured to:
  calculate a distance between the first viewing position and a predetermined reference viewing position;
  determine a first user-perceivable intensity for the first target image based on the calculated distance between the first viewing position and the predetermined reference viewing position;
  determine a first hologram corresponding to the first target image;
  send the first hologram to the holographic projector;
  calculate a distance between the second viewing position and the predetermined reference viewing position;
  determine a second user-perceivable intensity for the second target image based on the calculated distance between the second viewing position and the predetermined reference viewing position;
  determine a second hologram corresponding to the second target image; and
  send the second hologram to the holographic projector;
wherein the holographic projector is configured to:
  display the first hologram on the spatial light modulator;
  illuminate, with the at least one light source, the first hologram to holographically reconstruct the first target image at the first user-perceivable intensity;
  display the second hologram on the spatial light modulator; and
  illuminate, with the at least one light source, the second hologram to holographically reconstruct the second target image at the second user-perceivable intensity; and
wherein
  the second user-perceivable intensity is different to the first user-perceivable intensity, and
  a difference between the first user-perceivable intensity and the second user-perceivable intensity indicates to the user whether the second viewing position is closer to the predetermined reference viewing position or further from the predetermined reference viewing position compared to the first viewing position.

19. The head-up display of claim 18, further comprising a driver monitoring system arranged to:

determine the first viewing position of the user;
  send the first signal indicating the first viewing position to the controller;
  determine the second viewing position of the user; and
  send the second signal indicating the second viewing position to the controller.

20. A non-transitory computer-readable medium comprising instructions that, when executed by one or more processors, cause the one or more processors to:

receive a first signal indicating a first viewing position of a user within a viewing space of a head-up display, the user being a human user;
determine a first user-perceivable intensity for a first target image based on a distance between the first viewing position and a predetermined reference viewing position within the viewing space;
illuminate a first hologram corresponding to the first target image to holographically reconstruct the first target image at the first user-perceivable intensity;
then,
receive a second signal indicating a second viewing position of the user within the viewing space, wherein the second viewing position is different to the first viewing position;
determine a second user-perceivable intensity for a second target image based on a distance between the second viewing position and the predetermined reference viewing position within the viewing space; and
illuminate a second hologram corresponding to the second target image to reconstruct the second target image at the second user-perceivable intensity;
wherein
  the second user-perceivable intensity is different to the first user-perceivable intensity, and
  a difference between the first user-perceivable intensity and the second user-perceivable intensity indicates to the user whether the second viewing position is closer to the predetermined reference viewing position or further from the predetermined reference viewing position compared to the first viewing position.

* * * * *